US010904491B2

(12) United States Patent
Okada et al.

(10) Patent No.: US 10,904,491 B2
(45) Date of Patent: Jan. 26, 2021

(54) METHOD OF CONTROLLING MICROSCOPE SYSTEM, MICROSCOPE SYSTEM, AND RECORDING MEDIUM

(71) Applicant: SYSMEX CORPORATION, Kobe (JP)

(72) Inventors: Masaya Okada, Kobe (JP); Shigeki Iwanaga, Kobe (JP)

(73) Assignee: SYSMEX CORPORATION, Kobe (JP)

( * ) Notice: Subject to any disclaimer, the term of this patent is extended or adjusted under 35 U.S.C. 154(b) by 0 days.

(21) Appl. No.: 16/578,433

(22) Filed: Sep. 23, 2019

(65) Prior Publication Data

US 2020/0106993 A1    Apr. 2, 2020

(30) Foreign Application Priority Data

Sep. 28, 2018  (JP) ................. 2018-185592

(51) Int. Cl.
*H04N 7/18*     (2006.01)
*G06K 9/62*     (2006.01)
*G06T 3/40*     (2006.01)

(52) U.S. Cl.
CPC ........... *H04N 7/183* (2013.01); *G06K 9/6201* (2013.01); *G06T 3/4053* (2013.01); *G06T 2207/10056* (2013.01)

(58) Field of Classification Search
CPC .............. H04N 7/183; G06T 3/4053; G06T 2207/10056; G06K 9/6201; G02B 21/367; G02B 21/16; G02B 21/365; G02B 27/58

(Continued)

(56) References Cited

U.S. PATENT DOCUMENTS 6,341,035 B1 *  1/2002  Miura ................ G02B 21/0044
                                                      359/363
2007/0035621 A1 *  2/2007  Shimizu ................ G06T 3/4069
                                                      348/135

(Continued)

FOREIGN PATENT DOCUMENTS

EP   1598688 A2   11/2005
EP   1598688 A3   10/2006

(Continued)

OTHER PUBLICATIONS

Mark Bates et al, "Stochastic Optical Reconstruction Microscopy (STORM): A Method for Superresolution Fluorescence Imaging", Jun. 1, 2013, (Downloaded on Apr. 13, 2017), pp. 498-520, vol. 2013, No. 6, CSHL Press, Cold Spring Harbor, NY, USA, Cited in EESR issued on Feb. 20, 2020 in a counterpart European patent application.

(Continued)

*Primary Examiner* — Shan E Elahi
(74) *Attorney, Agent, or Firm* — Metrolex IP Law Group, PLLC

(57) ABSTRACT

A method according to one or more aspects may control a microscope system including an imaging unit configured to image a sample, and a display unit including a first display region and a second display region. The method may include: sequentially displaying, in the first display region, first images sequentially captured by the imaging unit; and displaying, in the second display region, a second image generated based on information extracted from the sequentially captured first images.

18 Claims, 15 Drawing Sheets

(58) Field of Classification Search
USPC .......................................................... 348/79
See application file for complete search history.

(56) References Cited

U.S. PATENT DOCUMENTS

| | | | | |
|---|---|---|---|---|
| 2011/0141103 A1* | 6/2011 | Cohen | ................... | G02B 21/367 |
| | | | | 345/419 |
| 2013/0286179 A1* | 10/2013 | Markle | ............... | G01N 21/6458 |
| | | | | 348/78 |
| 2014/0152794 A1* | 6/2014 | Takahashi | ................ | G01B 9/04 |
| | | | | 348/79 |
| 2015/0185465 A1* | 7/2015 | Karube | ................ | G02B 21/082 |
| | | | | 348/79 |
| 2015/0325216 A1* | 11/2015 | Park | ........................ | G06F 3/147 |
| | | | | 345/634 |

FOREIGN PATENT DOCUMENTS

| | | |
|---|---|---|
| EP | 2660639 A1 | 11/2013 |
| EP | 3293560 A1 | 3/2018 |
| JP | 2018-44997 A | 3/2018 |
| WO | 9839728 A1 | 9/1998 |

OTHER PUBLICATIONS

Extended European search report (EESR) dated Feb. 20, 2020 in a counterpart European patent application.

\* cited by examiner

SHADING POSITION

OPENING POSITION

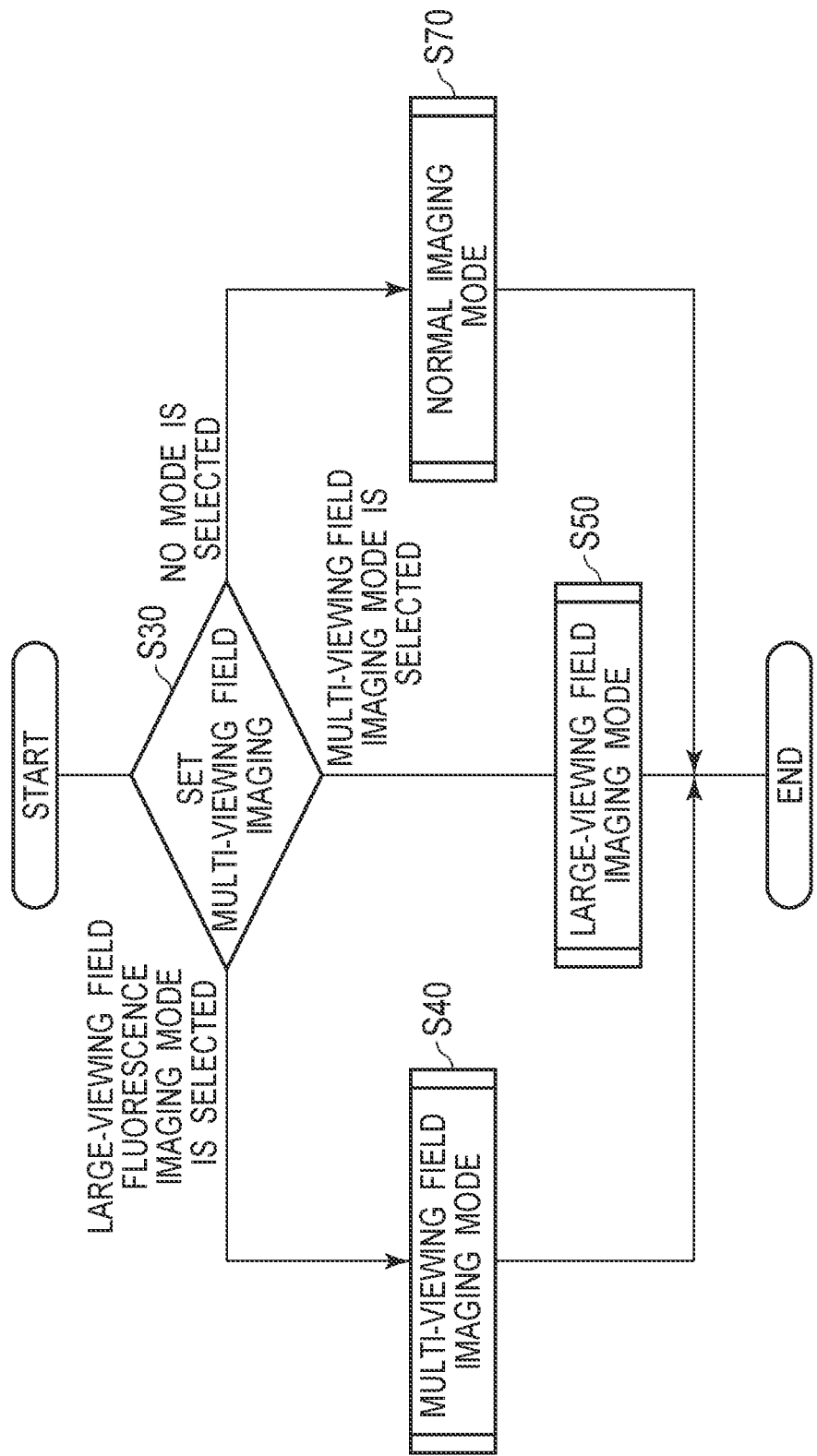

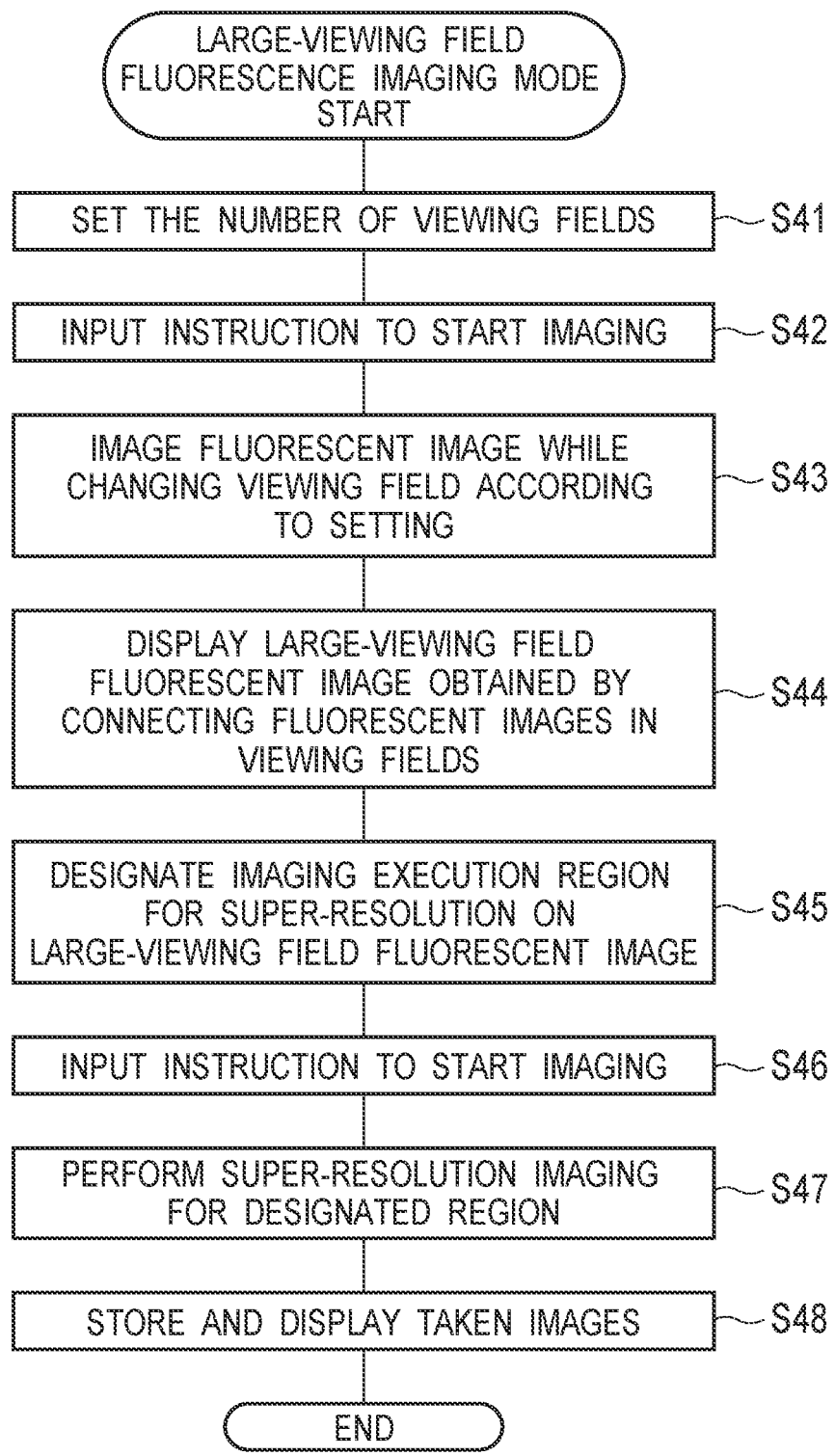

METHOD OF CONTROLLING MICROSCOPE SYSTEM, MICROSCOPE SYSTEM, AND RECORDING MEDIUM

CROSS REFERENCE TO RELATED APPLICATIONS

This application claims priority from to prior Japanese Patent Application No. 2018-185592 filed with the Japan Patent Office on Sep. 28, 2018, the entire contents of which are incorporated herein by reference.

BACKGROUND

The present disclosure relates to a method of controlling a microscope system, a microscope system that obtains a super-resolution image, and so on.

Fluorescence imaging capable of observing living cells plays an important role in clarifying life phenomenon. The resolution of optical microscopes is only about 200 nm due to optical diffraction limit, which is insufficient for observing complex structures present in cells.

However, in recent years, various kinds of techniques of obtaining an image having the resolution exceeding the optical diffraction limit (hereinafter referred to as super-resolution image) have been devised. Studies and inspections utilizing super-resolution images have become familiar. A microscope device that obtains such super-resolution images is disclosed in, for example, Japanese Patent Application Publication No. 2018-44997 ("Patent Literature 1").

Patent Literature 1 discloses a microscope device that obtains the super-resolution image. The microscope device disclosed in Patent Literature 1 includes (i) a housing in which a sample placement unit, an optical system, and an imaging unit are housed, and (ii) a movable unit that is integrated with a display unit for displaying images taken by the imaging unit and is movable relative to the sample placement unit.

In the microscope device disclosed in Patent Literature 1, a display screen of the display unit includes a camera screen display region and a super-resolution image display region. The camera screen display region displays a camera image taken by the imaging unit (more strictly, imaging element) in real time. The super-resolution image display region displays a super-resolution image constructed by the microscope device.

Although use of the super-resolution image have become familiar, it is not easy to obtain a desired super-resolution image. For example, in constructing the super-resolution image by use of the microscope device in Patent Literature 1, the following (Step 1) to (Step 6) are performed: (Step 1) set a sample and start imaging; (Step 2) display a camera image taken in real time in the camera screen display region; (Step 3) determine the visual field for imaging and set imaging parameters; (Step 4) start imaging; (Step 5) store taken images; (Step 6) determine to construct a super-resolution image; and (Step 7) display the constructed super-resolution image in the super-resolution image display region.

Among the above-mentioned steps, especially (Step 3) and (Step 6) are not easy, possibly failing to obtain a desired super-resolution image. For example, to determine the viewing field from the camera image taken in real time and properly set the imaging parameters in (Step 3), even experienced users often require trial and error. In (Step 6), without knowing what super-resolution image will be constructed, the user must determine whether or not to construct the super-resolution image.

If the super-resolution image displayed in (Step 7) is not a desired image, (Step 3) to (Step 7) need to be performed again. However, in the case where the super-resolution image is constructed using images of fluorescence emitted from fluorescent dye molecules used to observe the sample, the imaging cannot be repeated again and again since the fluorescence intensity of the fluorescent dye molecules attenuates due to light irradiation.

One or more aspects are devised in consideration of the above-described problems, and aim to make it easy to obtain a desired super-resolution image.

SUMMARY

A method according to one or more aspects may control a microscope system including an imaging unit configured to image a sample, and a display unit including a first display region and a second display region. The method may include: sequentially displaying, in the first display region, first images sequentially captured by the imaging unit; and displaying, in the second display region, a second image generated based on information extracted from the sequentially captured first images.

A microscope system according to one or more aspects may include: an imaging unit that image a sample; and a display unit including a first display region and a second display region. The display unit sequentially may display, in the first display region, first images sequentially captured by the imaging unit. The display unit may display, in the second display region, a second image generated based on information extracted from the sequentially captured first images.

A non-transitory computer-readable storage medium storing a program for a computer according to one or more aspects may be used in a microscope system. The program, when read and executed, may cause the computer to perform operations including: sequentially displaying, in a first display region of a display unit, first images of a sample sequentially captured by an imaging unit; and displaying, in a second display region of the display unit, a second image generated based on information extracted from the sequentially captured first images.

A method according to one or more aspects may control a microscope system including an imaging unit and a display unit. The method may including: sequentially displaying, in the display unit, first images sequentially captured by the imaging unit; displaying, in the display unit, a second image generated based on information extracted from the sequentially captured first images; and displaying, in the display unit, a super-resolution image constructed based on third images sequentially captured by the imaging unit.

A microscope system according to one or more aspects may include: an imaging unit; and a display unit. The display unit may include a first display region and a second display region. The display unit may sequentially display, in the first display region, first images sequentially captured by the imaging unit. The display unit may display, in the second display region, a second image generated based on information extracted from the sequentially captured first images. The display unit may display a super-resolution image constructed based on third images sequentially captured by the imaging unit.

BRIEF DESCRIPTION OF DRAWINGS

FIG. 12 is a flow diagram illustrating a sequence of processing in accordance with an embodiment 2;

FIG. 13 is a flow diagram illustrating a sequence of processing in a large-viewing field fluorescence imaging mode;

DETAILED DESCRIPTION

Figure 1:
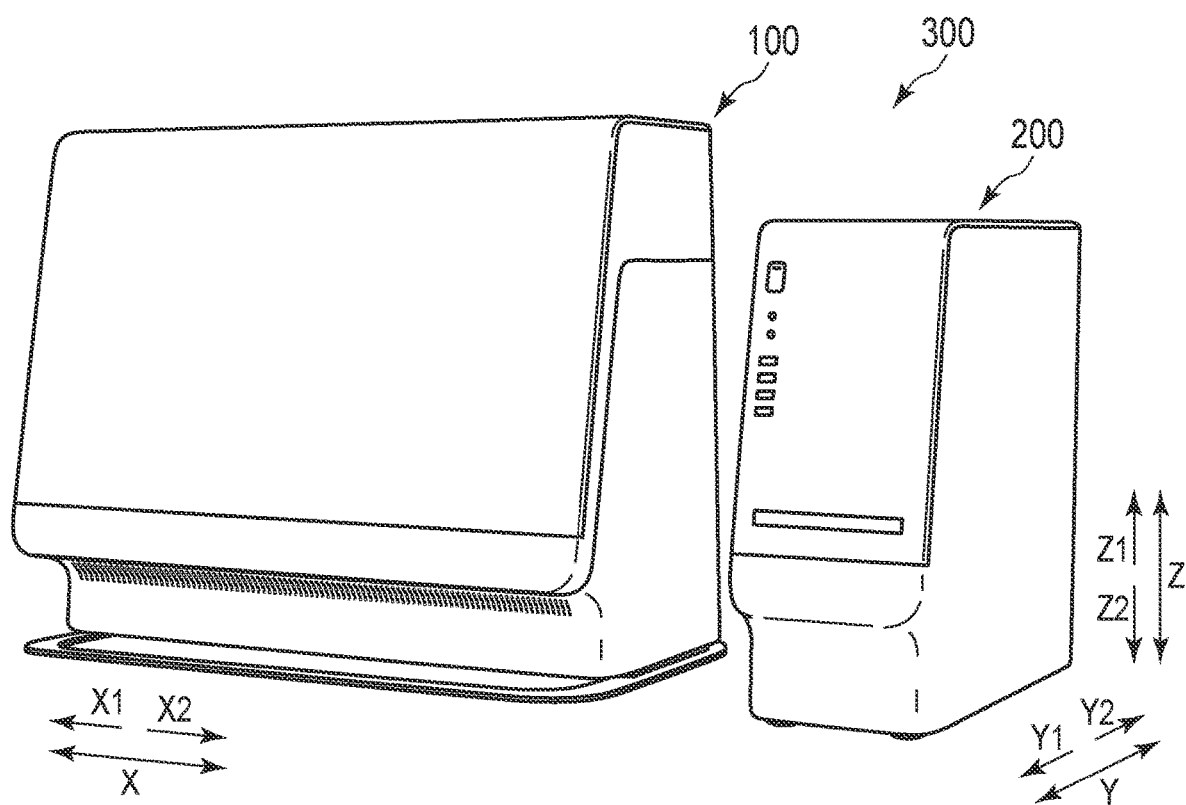
FIG. 1 is a perspective diagram illustrating an example of a configuration of a microscope system in accordance with an embodiment 1.

To attain the above-mentioned object, a method of controlling a microscope system (300) from one or more aspects is a method of controlling the microscope system (300) including an imaging unit (10*b*) and a display unit (21) having a first display region (31) and a second display region (32), and the method includes sequentially displaying first images sequentially taken by the imaging unit (10*b*) in the first display region (31) (Step S2), and displaying a second image generated based on information extracted from the sequentially taken first images in the second display region (32) (Step S4).

The "first image" described herein refers to an image taken by the imaging unit (10*b*) in real time in a stage of generating the second image (first stage). The "first image" is referred as "live image". The "second image" refers to an image for allowing the user of the microscope system (300) to confirm a region to be included in the super-resolution image, the composition of the super-resolution image, and so on, before the construction of the super-resolution image. Thus, the "second image" is also referred to as "preview image".

With the above-described configuration, by displaying the second image (preview image) in the second display region (32), the user of the microscope system (300) may roughly predict display contents of the super-resolution image. That is, before the construction of the super-resolution image, it is possible to confirm whether or not the imaging conditions at the current time are suitable for the construction of the super-resolution image. Therefore, the super-resolution image may be obtained more easily than conventional. Further, time to obtain the super-resolution image may be advantageously reduced.

The method of controlling the microscope system (300) may further include sequentially taking third images for constructing a super-resolution image by the imaging unit (10*b*).

The "third image" described herein refers to an image to be used for constructing the super-resolution image among the images taken by the imaging unit (10*b*) in a stage of constructing the super-resolution image (second stage). The "third image" is also referred to as "target image".

With the above-described configuration, the third images for constructing the super-resolution image may be taken.

The method of controlling the microscope system (300) may further include applying first processing to the first images to generate the second image, and applying second processing different from the first processing to the third images to construct the super-resolution image.

According to the method of controlling the microscope system (300), in the second processing, luminous points may be extracted from the third images by template matching, and in the first processing, template matching may not be performed.

According to the method of controlling the microscope system (300), in the second processing, a central position of each of the extracted luminous points may be identified by fitting based on a point spread function, and in the first processing, the central position of each of the luminous points may not be identified by fitting based on the point spread function.

According to the method of controlling the microscope system (300), in the second processing, image correction for a stage drift during may be performed, and in the first processing, the image correction for the stage drift may not be performed.

With the above-described configuration, the super-resolution image may be preferably constructed from the third images.

According to the method of controlling the microscope system (300), the second image may be a preview image schematically stimulating a super-resolution image.

With the above-described configuration, by displaying the preview image in the second display region (32), the user of the microscope system (300) may roughly predict display contents of the super-resolution image.

The method of controlling the microscope system (300) may further include receiving an input to change a first imaging condition after displaying the second image in the second display region (32) (Step S6).

In the method of controlling the microscope system (300), after the input to change the first imaging condition is received, the first images may be taken using the changed first imaging condition.

The method of controlling the microscope system (300) may further include receiving an instruction to take the third images for constructing the super-resolution image after displaying the second image in the second display region (32) (Step S9).

By generating the second image representing the luminous points extracted from the first images and displaying the second image as a pseudo super-resolution image, even when the super-resolution image is not actually constructed, the user may determine whether or not the imaging target and the imaging position at the current time are proper. By performing imaging for constructing the super-resolution image after that the user determines that the imaging target and the imaging position are proper, the super-resolution image may be prevented from being constructed using any improper image.

The method of controlling the microscope system (300) may further include receiving an input of a second imaging condition to be used with the first imaging condition for taking the third images after receiving the instruction (Step S6).

According to the method of controlling the microscope system (300), the imaging condition may include a range of the sample to be imaged, an exposure time, and a type of a light source for imaging.

By properly setting the imaging condition for taking the third images, an image suitable for constructing the super-resolution image may be taken.

According to the method of controlling the microscope system (300), the second imaging condition may include the number of the third images.

According to the method of controlling the microscope system (300), the first images are fluorescent images, and information extracted from the first images may be information about the luminous points in the first images.

With the above-described configuration, an image stimulating the super-resolution image may be generated as the preview image.

According to the method of controlling the microscope system (300), the imaging condition may include a range of the sample to be imaged, an exposure time, a type of a light source for imaging, or the number of taken third images.

According to the method of controlling the microscope system (300), the third images may be continuous images captured by continuously imaging the sample.

By using the continuous images captured by continuously imaging the sample, the super-resolution image of the sample intermittently exhibiting the fluorescence may be properly constructed.

The method of controlling the microscope system (300) may further include receiving, as a processing condition for constructing the super-resolution image, at least one of information designating a region to be used for construction in the third images or information specifying the image to be used for construction among the third images (Step S24).

With the above-described configuration, the image or its region that is suitable for constructing the super-resolution image may be narrowed down from the taken third images, thereby reducing time to construct the super-resolution image.

The method of controlling the microscope system (300) may further include displaying at least part of the taken third images or a composite image obtained by combining the third images in the display unit (21) (Step S21), constructing the super-resolution image using at least part of the third images (Step S25), and displaying the constructed super-resolution image on the display unit (21) (Step S26).

By displaying at least part of the taken third images or a composite image obtained by combining the third images on the display unit (21), the user may confirm whether or not the taken third images are proper as the images for constructing the super-resolution image. Since the super-resolution image is constructed in consideration of the user's confirmation, the super-resolution image may be prevented from being constructed using any improper image.

The method of controlling the microscope system (300) may further include capturing the first images while changing a range of the sample to be imaged by the imaging unit (10*b*).

The method of controlling the microscope system (300) may further include displaying a large-viewing field fluorescent image obtained by connecting fluorescent images taken at a plurality of imaging positions while changing the range of the sample to be imaged in the display unit (21) (Step S44). The large-viewing field fluorescent image may be displayed in the first display region (31), in a pop-up screen (310), or in both of them.

With the above-described configuration, the large-viewing field image may be obtained by taking the first images while changing the imaging position. By displaying the image obtained by connecting the first images, the large-viewing field image may be presented to the user.

In the method of controlling the microscope system (300), the third images are fluorescent images, the fluorescence intensity may be detected at each imaging position while changing the imaging position of the imaging unit (10*b*), and the third image may be taken at the imaging position at which a larger fluorescence intensity than a predetermined threshold value is detected.

With the above-described configuration, any image having a smaller fluorescence intensity than the predetermined threshold value is not used for constructing the super-resolution image, enabling reduction of time required to construct the super-resolution image.

A microscope system (300) according to one or more aspects is a microscope system including an imaging unit (10*b*) and a display unit (21) having a first display region (31) and a second display region (32), and the display unit (21) sequentially displays first images sequentially taken by the imaging unit (10*b*) in the first display region (31), and displays a second image generated based on information extracted from the sequentially taken first images in the second display region (32).

Also in the microscope system (300), by displaying the second image (preview image) in the second display region (32), the user may roughly predict display contents of the super-resolution image. Thus, a desired super-resolution image may be obtained more easily.

In the microscope system (300), the imaging unit (10*b*) may sequentially take third images for constructing a super-resolution image.

The microscope system (300) may further include a control device (200), and the control device (200) may apply first processing to the first images to generate a second image, and apply second processing different from the first processing to the third images to the super-resolution image.

In the microscope system (300), the control device (200) may execute processing of extracting the luminous points from the first images by template matching in the second processing, and may not perform the template matching in the first processing.

In the microscope system (300), the control device (200) may identify the central position of each of the extracted luminous points by fitting based on a point spread function in the second processing, and may not identify the central position of each of the luminous points by fitting based on the point spread function in the first processing.

In the microscope system (300), the control device (200) may perform image correction for a stage drift during imaging in the second processing, and may not perform the image correction for the stage drift in the first processing.

With the above-described configuration, the super-resolution image may be preferably constructed from the third images.

In the microscope system (300), the second image may be a preview image schematically stimulating the super-resolution image.

With the above-described configuration, by displaying the preview image in the second display region (32), the user of the microscope system (300) may roughly predict display contents of the super-resolution image.

A program according to one or more aspects is a program for a computer used in a microscope system (300), and causes the computer to sequentially display first images sequentially taken by an imaging unit (10b) in a first display region (31) of a display unit (21) (Step S21), and display a second image generated based on information extracted from the sequentially taken first images in a second display region of the display unit (21) (Step S25).

A computer-readable recording medium that records the above-described program falls within the technical scope of one or more aspects.

A method of controlling the microscope system (300) according to one or more aspects is a method of controlling a microscope system including an imaging unit and a display unit, and includes sequentially displaying first images sequentially taken by the imaging unit (10b) in the display unit (21), displaying a second image generated based on information extracted from the sequentially taken first images in the display unit (21), and displaying a super-resolution image constructed based on third images sequentially taken by the imaging unit (10b) in the display unit (21).

A microscope system (300) according to one or more aspects is a microscope system including an imaging unit (10b) and a display unit (21), and the display unit (21) includes a first display region (31) and a second display region (32), sequentially displays first images sequentially taken by the imaging unit (10b) in the first display region (31), displays a second image generated based on information extracted from the sequentially taken first images in the second display region (32), and displays a super-resolution image constructed based on third images sequentially taken by the imaging unit (10b).

With the above-described configuration, by displaying the second image (preview image) in the second display region (32), the user of the microscope system (300) may roughly predict display contents of the super-resolution image. That is, before the construction of the super-resolution image, it is possible to confirm whether or not the imaging conditions at the current time is suitable for constructing the super-resolution image. Therefore, a desired super-resolution image may be obtained more easily than conventional. Further, time to obtain the super-resolution image can be advantageously reduced.

According to one or more aspects, the time to obtain the super-resolution image can be reduced than conventional.

Embodiment 1

A microscope system 300 in accordance with an embodiment 1 is described below. FIG. 1 is a perspective view illustrating an example of the configuration of the microscope system 300. As illustrated in FIG. 1, the microscope system 300 includes a microscope device 100 and a control device 200. The microscope device 100 and the control device 200 are connected to each other so as to communicate a signal therebetween. For example, the microscope device 100 and the control device 200 are interconnected in a wired or wireless manner.

(Configuration of Microscope Device 100)

Figure 2A:
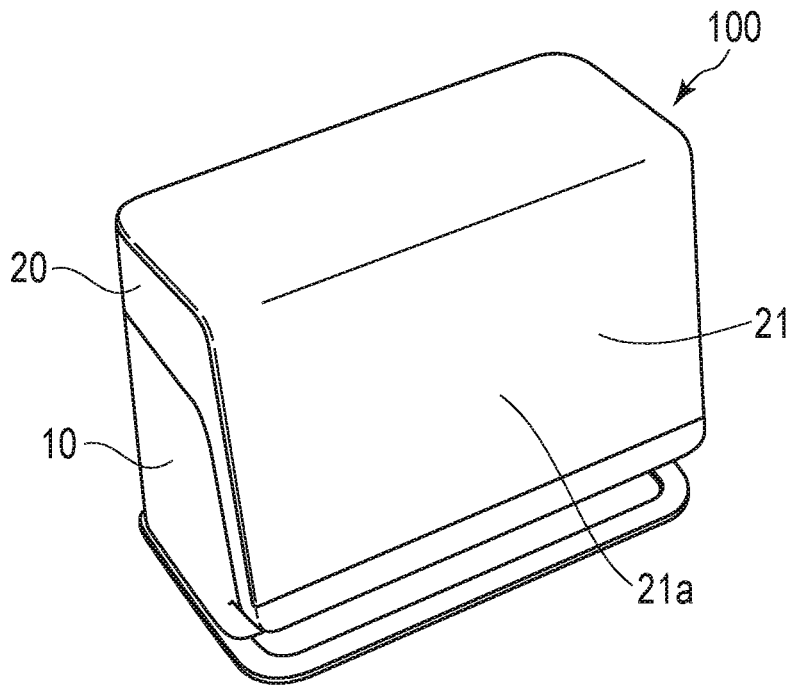
FIG. 2A and FIG. 2B are perspective diagrams each illustrating an example of the configuration of a microscope device included in a microscope system, such as in FIG. 1.
Figure 2B:
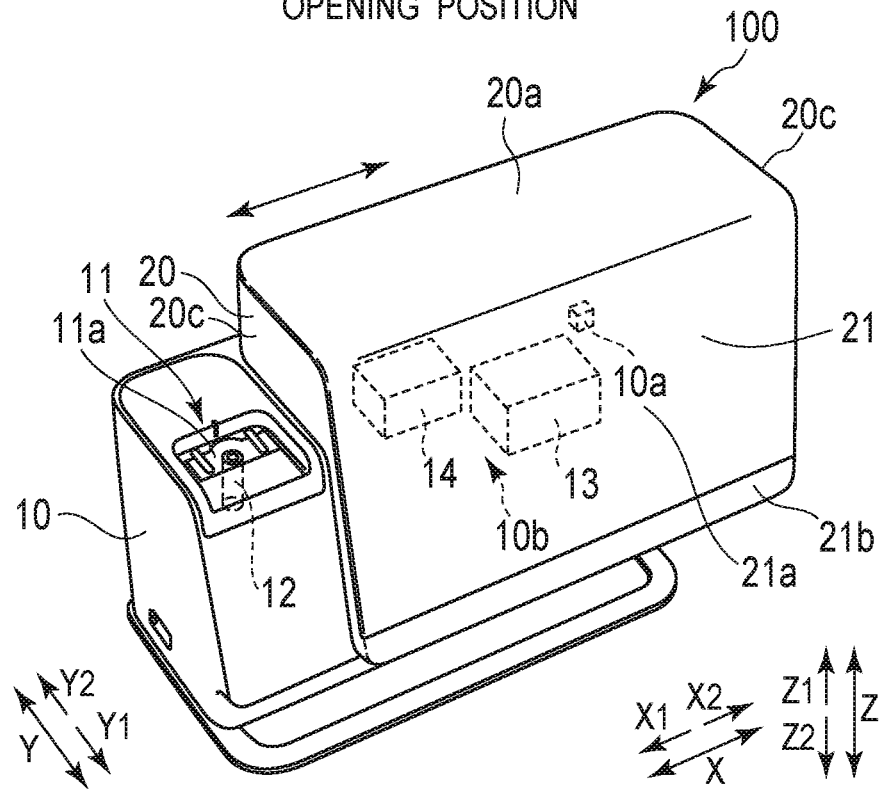

FIG. 2A and FIG. 2B are perspective views each illustrating an example of the configuration of the microscope device 100. The microscope device 100 is a device that magnifies and display a sample placed on a sample placement unit 11. The resolution of the microscope device 100 may be, for example, about 20 to 50 nm in the horizontal direction and 20 to 50 nm in the Z-axis direction. The resolution of the microscope device 100 is about ten times as high as the resolution of conventional optical microscopes. The sample is a living sample taken from a subject (examinee), such as cells and living tissues. However, as described below, the sample is not limited to living samples.

As illustrated in FIG. 2A and FIG. 2B, the microscope device 100 includes a housing 10 and a movable unit 20. The microscope device 100 includes an imaging unit 10b and a sample placement unit 11. The imaging unit 10b includes an objective lens 12, a light source 13, and an imaging element 14. The sample placement unit 11 is provided on an upper face (face on the Z1 direction side) of the housing 10.

The objective lens 12, the light source 13, and the imaging element 14 are provided in the housing 10. The microscope device 100 includes a display unit 21. The display unit 21 is provided on a front face (face on the Y1 direction side) of the movable unit 20. A display plane 21a of the display unit 21 is positioned on the front face of the movable unit 20. The microscope device 100 includes a driving unit 10a that moves the movable unit 20 with respect to the housing 10. However, as described in a below-mentioned modification, in the microscope system of an embodiment, the display unit 21 is not necessarily integrated with the microscope device 100, and may be separated from the microscope device 100.

Hereinafter, two directions orthogonal to each other in a plane parallel to the placement face of the microscope device 100 (that is, in the horizontal plane) are referred to as X direction and Y direction. As illustrated in FIG. 1, the microscope device 100 has a substantially rectangular contour along the X direction and the Y direction in a plan view. The X direction is the transverse direction of the microscope device 100, and the Y direction is the anteroposterior direction of the microscope device 100. The Y1 direction is the direction toward the front face of a body of the device, and the Y2 direction is the direction toward the rear face of the body of the device. The Z direction is the vertical direction that is orthogonal to the horizontal plane. The Z1 direction is the upward direction and the Z2 direction is the downward direction.

Along with the display unit 21, the movable unit 20 is movable to a shading position where the movable unit covers the sample placement unit 11 (see FIG. 2A) and an opening position where the movable unit opens the sample placement unit 11 (See FIG. 2(b)) with respect to the housing 10. Specifically, the movable unit 20 slides with respect to the housing 10 in the direction that is substantially parallel to the placement plane of the housing 10, to move to the shading position or the opening position.

As described above, the movable unit 20 may move with respect to the housing 10 in the lateral direction (X direction) rather than the vertical direction (Z direction) and therefore, may easily move to the shading position or the opening position with respect to the housing 10 while suppressing the effect of gravity. Since the shading position and the opening position may be located in parallel, the display unit 21 provided on the movable unit 20 may be viewed at the same level both at the opening position and the shading position. This enables an improvement in the visibility of the display unit 21.

The sample placement unit 11 is positioned on the upper face (face on the Z1 direction side) of the housing 10, which is substantially parallel to the placement plane of the housing 10. For example, when the movable unit 20 moves to the opening position, the upper side of the sample placement unit 11 may be opened to easily access the sample placement unit 11.

In the state where the movable unit 20 moves to the opening position with respect to the housing 10, the sample is placed on the sample placement unit 11. In the state where the movable unit 20 moves to the shading position with respect to the housing 10, the sample on the sample placement unit 11 is imaged.

The sample placement unit 11 is recessed on the upper face of the housing 10 such that portions except for one side in the horizontal direction side and the upper side are surrounded with a wall. For example, the sample placement unit 11 is recessed on the upper face of the housing 10 such that portions except for portions opposed to the front face and the upper face of the housing 10 are surrounded with the wall. When the movable unit 20 is located at the opening position, the upper side and the one side in the horizontal direction of the sample placement unit 11 are opened. For example, when the movable unit 20 is located at the opening position, the upper side (Z1 direction) and the front side (Y1 direction) of the sample placement unit 11 are opened. Thus, when the movable unit 20 is located at the opening position, the sample placement unit 11 may be accessed more easily.

The sample placement unit 11 includes a stage 11a. The stage 11a may move in the horizontal direction (X direction and Y direction) and the vertical direction (Z direction). The stage 11a is independently movable in the X direction, the Y direction, and the Z direction. Thereby, the sample may be moved with respect to the objective lens 12, to magnify a desired position of the sample for viewing.

As illustrated in FIG. 2B, the objective lens 12 is positioned in the vicinity of the stage 11a of the sample placement unit 11. The objective lens 12 is provided below the stage 11a of the sample placement unit 11 (Z2 direction) so as to be opposed to the sample placement unit 11. The objective lens 12 is movable with respect to the sample placement unit 11 in the vertical direction.

The light source 13 irradiates the sample with light from the same side as the imaging element 14 via the objective lens 12. The light source 13 may output light having a predetermined wavelength or light having different wavelengths. The light source 13 includes a light emitting element. Examples of the light emitting element include an LED (Light Emitting Diode) element and a laser element.

Figure 3:
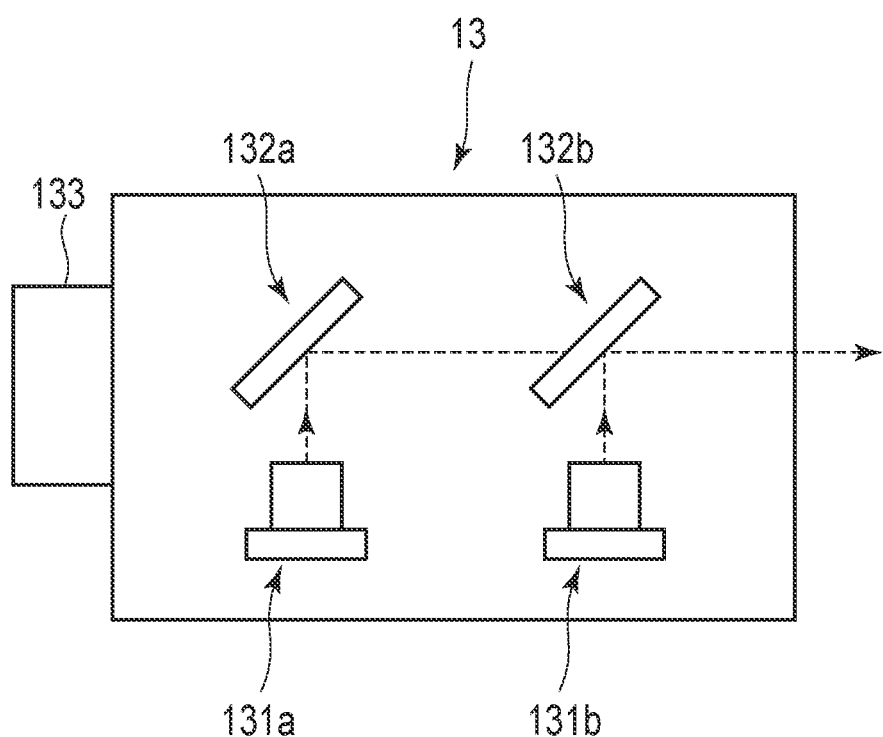
FIG. 3 is a diagram illustrating an example of a configuration of a light source included in a microscope, such as in FIG. 2A and FIG. 2B.

FIG. 3 is a view illustrating an example of the configuration of the light source 13. As illustrated in FIG. 3, the light source 13 includes a first light source 131a, a second light source 131b, a mirror 132a, an optical filter 132b, and a fan 133. The first light source 131a and the second light source 131b output light having different wavelengths. In an embodiment 1, the microscope device 100 captures a fluorescent image according to Stimulated Emission Depletion Microscopy (STED). In this case, for example, the first light source 131a emits excitation light, and the second light source 131b emits STED light. The first light source 131a and the second light source 131b each can emit laser light. Light emitted from the second light source 131b may be light in a visible light region, or light in an invisible light region such as an infrared region or an ultraviolet region.

The light outputted from the first light source 131a is reflected on the mirror 132a, passes through the optical filter 132b, and is outputted from the light source 13. The light outputted from the second light source 131b is reflected on the optical filter 132b and is outputted from the light source 13. In this manner, the light outputted from the first light source 131a and the light outputted from the second light source 131b are outputted from the light source 13, with their optical axes being matched. The optical filter 132b is, for example, a dichroic mirror or a long-pass filter.

The fan 133 is positioned in the housing 10 to cool the light source 13. Specifically, the fan 133 is driven to generate an air flow around the light source 13, thereby removing heat generated from the light source 13. Preferably, the fan 133 stops its operation during imaging of the sample by the imaging element 14. This may prevent vibrations of the fan 133 from being transmitted to the imaging element 14 and the sample placement unit 11 during imaging, enabling accurate imaging of the sample. However, the fan 133 may be driven during imaging of the sample by the imaging element 14.

The imaging element 14 images the sample based on light emitted from the light source 13. Specifically, the imaging element 14 images a static image or a continuous image of the sample based on the light emitted from the light source 13. Examples of the image taken by the imaging element 14 include a dark field image, a fluorescent image, and a bright field image. The imaging element 14 includes a CCD (Charge Coupled Device) element and a CMOS (Complementary Metal Oxide Semiconductor) element.

As described later, a plurality of fluorescent dye molecules are combined with the sample, and at a certain timing, some of the fluorescent dye molecules exhibit the fluorescence. The imaging element 14 is configured to perform imaging at predetermined time intervals (for example, every 30 to 100 milliseconds), thereby imaging light emitted from the blinking fluorescent dye molecules among the fluorescent dye molecules at a "bright" timing. In this manner, the fluorescence emitted from each fluorescent dye molecules may be spatially separated and captured to take images.

The display unit 21 displays the image taken by the imaging element 14 and the image generated based on the taken image. In particular, the display unit 21 displays below-mentioned live image, preview image, target image, and super-resolution image. The display unit 21 may display a screen for operating the microscope device 100 and a screen for indicating the state of the microscope device 100. The display unit 21 may display a screen based on a program in taking images of the sample and a screen based on a signal from the external control device 200.

The display unit 21 is, for example, a liquid crystal display. In the example of an embodiment 1, the display unit 21 is arranged on a side face of the movable unit 20. For example, the display unit 21 is arranged on the front side (Y1 direction side) of the movable unit 20. The need to install the display unit separately from the microscope device 100 may be eliminated by providing the display unit 21 integrally with the movable unit 20, leading to a decrease in the footprint of the microscope system 300. However, as described below, the display unit 21 may be provided outside the microscope device 100.

(Sample)

Substances to be imaged are, for example, tissues or cells collected from living bodies. The types of the tissues and cells are not particularly limited. The substances to be imaged are not limited to substances included in living samples and may be substances that are not derived from living samples. For example, the substances to be imaged may be fluorescent substances including particles exhibiting the fluorescence, such as fluorescent beads. In following description, the living tissue is used as the substance to be imaged.

According to STED, a fluorescent image is captured by utilizing stimulated emission. The stimulated emission is the phenomenon that, when fluorescent dye molecules in the active state are irradiated with light having lower energy than excitation light, the fluorescent dye molecules do not exhibit fluorescence and are forcibly returned to the inactive state. A sequence of processing of capturing the fluorescent image according to STED is as follows, for example. (1) First, fluorescent dye molecules are evenly distributed in a sample. (2) Subsequently, the sample located at a predetermined position is irradiated with excitation light that is spot light. (3) Then, the sample is irradiated with STED light so as to surround a spot of the excitation light. Thereby, in a surrounding region except for the spot, fluorescent dye molecules are suppressed from emitting the fluorescence. Thus, the fluorescence can be observed only at the position corresponding to the spot. (4) Then, the spot of the excitation light is displaced and then, the above (2) to (4) are repeated. In this manner, the fluorescent dye molecules located at different positions can be selectively blinked. That is, using stimulated emission, fluorescence may be observed in unit of molecule. Any well-known method of irradiating fluorescent dye molecules in the active state with light to capture the fluorescent image may be applied to the microscope device 100. Alternatively, the microscope device 100 may capture the fluorescent image using fluorescent dye molecules modified to autonomously switch between the active state and the inactive state. As described above, each fluorescent dye molecule blinks at predetermined time intervals. However, each fluorescent dye molecule gradually decays while repeating blinking. For this reason, it is preferable to finish imaging as soon as possible.

When the living tissue is irradiated with light from the first light source 131a for a predetermined time, each fluorescent dye molecule blinks in the active state. The proportion of activated fluorescent dye molecules is changed by adjusting the irradiation time of the light from the first light source 131a.

(Configuration of Control Device 200)

Figure 4:
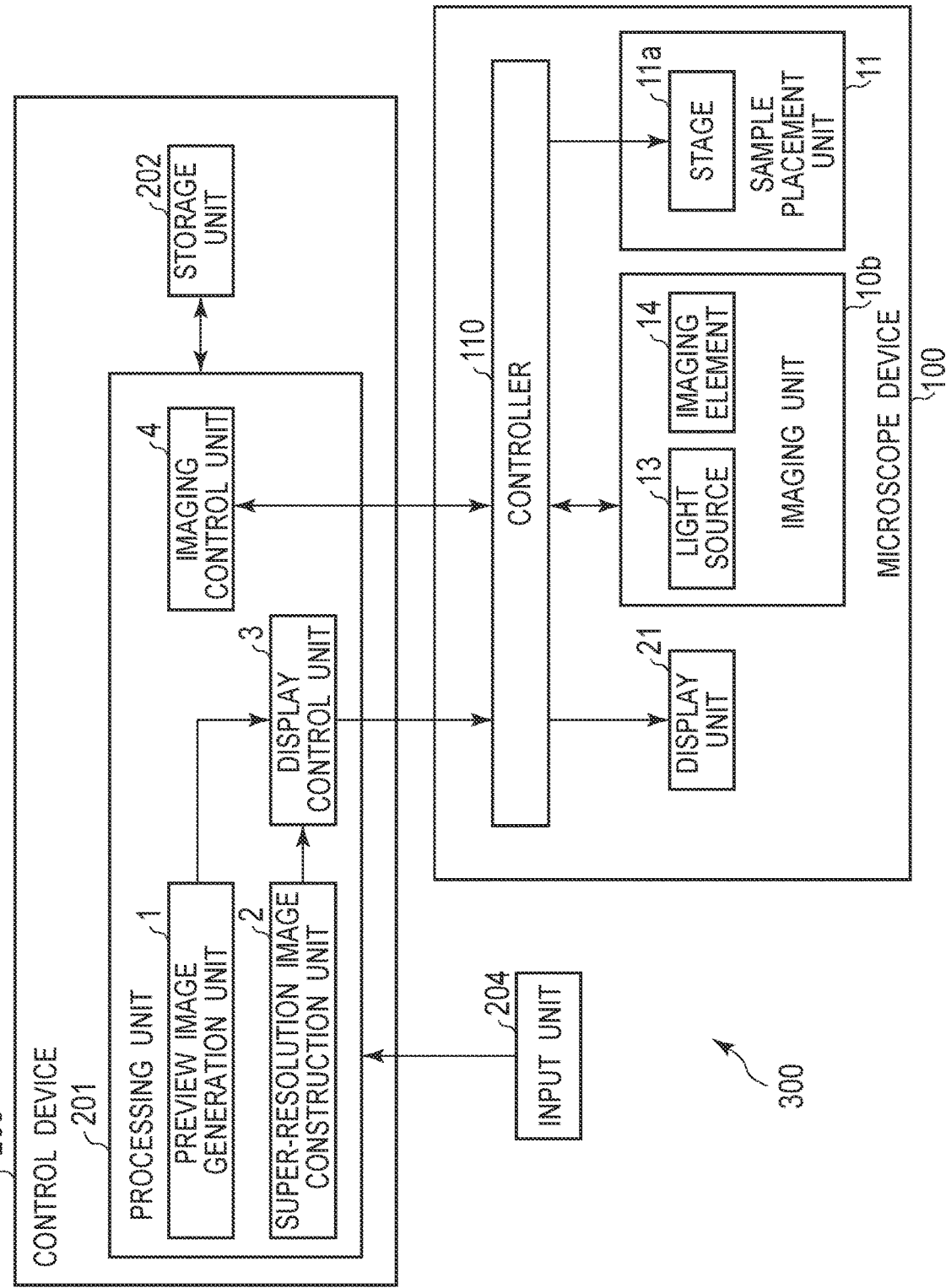
FIG. 4 is a functional block diagram schematically illustrating a configuration of a control unit and peripheral units in a microscope system, such as in FIG. 1.

FIG. 4 is a functional block diagram schematically illustrating the configuration of the control device 200 and peripheral units. FIG. 4 illustrates, among components of the microscope device 100, only components under control of the control device 200. The control device 200 is configured to control the microscope device 100. The control device 200 is configured of, for example, a computer, and includes a CPU (Central Processing Unit), a memory, and so forth. The control device 200 controls sample imaging processing of the microscope device 100 to process a taken image. The control device 200 may output the processed image to the microscope device 100 and display the images on the display unit 21 of the microscope device 100. The control device 200 may magnify and display the sample image taken by the microscope device 100 on the display unit 21. The control device 200 controls the movement of the movable unit 20 of the microscope device 100 to the shading position or the opening position.

As illustrated in FIG. 4, the control device 200 includes a processing unit 201 and a storage unit 202. An input unit 204 is connected to the control device 200.

The processing unit 201 includes, for example, a CPU, and controls the operation of the microscope device 100.

The storage unit 202 includes, for example, an HDD (Hard Disk Drive) and an SSD (Solid State Drive), and stores a program executed by the control device 200 and information. The input unit 204 receives the operation (instruction) of the user. The input unit 204 includes, for example, a mouse and a keyboard.

As illustrated in FIG. 4, the processing unit 201 includes a preview image generation unit 1, a super-resolution image construction unit 2, a display control unit 3, and an imaging control unit 4. In the microscope system 300, the step of obtaining the super-resolution image is briefly divided into a first stage (image capture mode) and a second stage (image process mode). The first stage includes a step of generating the preview image artificially representing the super-resolution image and displaying the generated preview image, and a step of sequentially taking target images for constructing the super-resolution image by the imaging unit 10b. The second stage includes a step of constructing the super-resolution image using the images captured in the first stage.

The preview image generation unit 1 generates the preview image from the live images taken under control of the imaging control unit 4. The live image means the image taken by the imaging unit 10b in real time in the first stage. The live image is also referred to as a first image. On the other hand, the preview image is also referred to as a second image. A specific example of processing of generating the preview image is described later.

The preview image is an image schematically reproducing the super-resolution image described below (See FIGS. 6 and 7). Thus, the preview image may be also referred to as pseudo super-resolution image. The display unit 21 sequentially displays live images sequentially taken by the imaging unit 10b in the first display region, and displays the preview image generated based on information extracted from the sequentially taken live images in the second display region. The user of the microscope system 300 may refer to the preview image in the first stage, thereby predicting displayed contents of the super-resolution image to be constructed in the future second stage.

The super-resolution image construction unit 2 constructs the super-resolution image from the target images taken under control of the imaging control unit 4. The target images mean the images for constructing the super-resolution image among the images taken by the imaging unit 10b. The imaging unit 10b sequentially takes the target images for constructing the super-resolution image. The target image is also referred to as a third image. A specific example of processing of generating the super-resolution image is described later.

That is, the preview image generation unit 1 applies first processing to the first images to generate the second image, and the super-resolution image construction unit 2 applies second processing different from the first processing to the third images to construct the super-resolution image.

Figure 5:
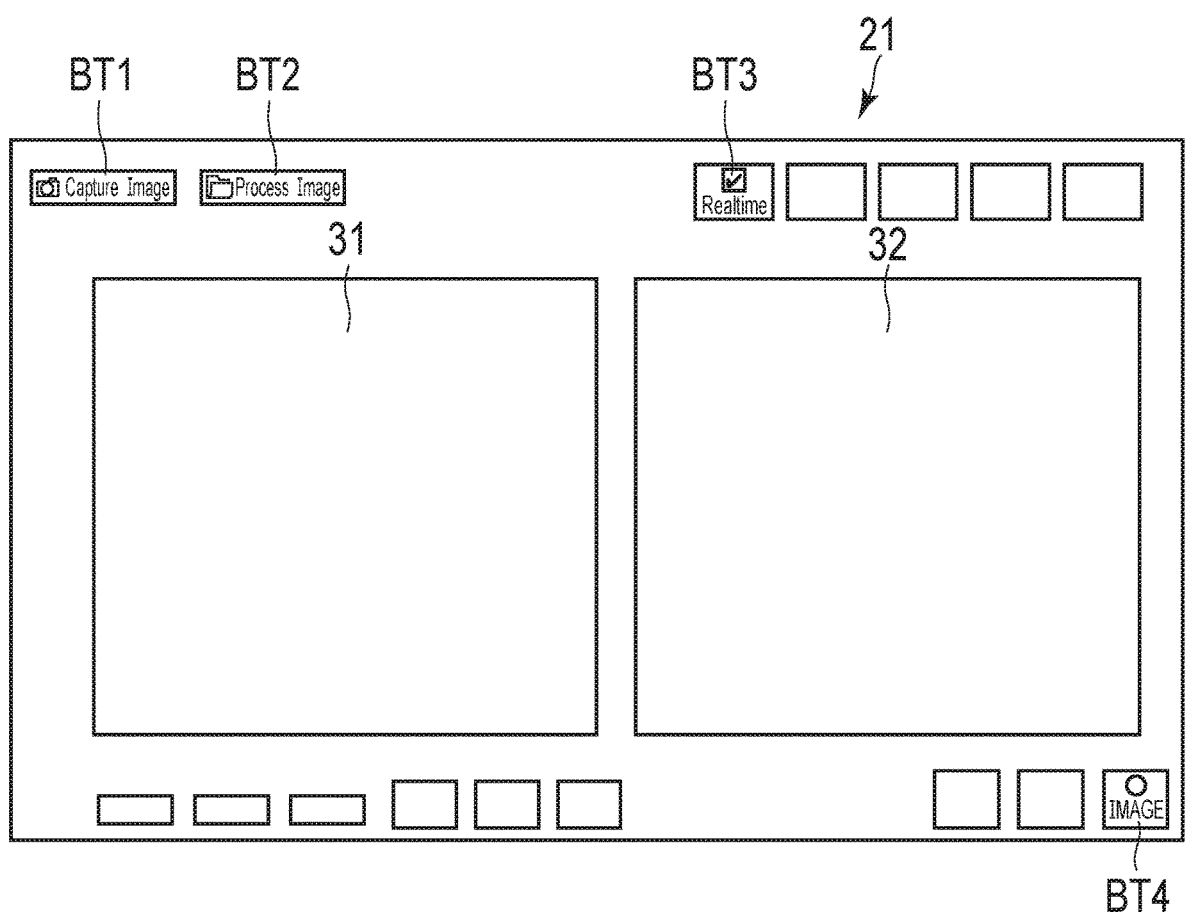
FIG. 5 is a diagram illustrating an example of layout of a display unit in a first stage.

The display control unit 3 displays various images on the display unit 21. FIG. 5 is a view illustrating an example of layout of the display unit 21 in the first stage. As illustrated in FIG. 5, the display unit 21 includes a first display region 31 and a second display region 32 as main display regions. The first display region 31 and the second display region 32 are provided side by side on the display screen of the display unit 21.

As illustrated in FIG. 5, various buttons (icons) are displayed on the display unit 21 so as to enable the user to operate a GUI (Graphical User Interface). In following description, for convenience, the display unit 21 is a touch panel. In this case, the user may press (touch) a predetermined button to perform the operation corresponding to the predetermined button. For convenience of description, in FIG. 5, only the main buttons that are highly related to an embodiment 1 among the various buttons are given reference numerals. However, using the input unit 204, the user may perform various operations in the first stage and the second stage. That is, the display unit 21 may not be the touch panel.

In the first stage, the display control unit 3 displays the live image (first image) in the first display region 31, and the preview image (second image) in the second display region 32. In the second stage, the display control unit 3 displays the target image (third image) in the first display region 31, and the super-resolution image in the second display region 32.

The imaging control unit 4 controls the imaging unit 10b. Specifically, the imaging control unit 4 controls the imaging unit 10b so as to take various images under predetermined imaging conditions. In the example illustrated in FIG. 4, the microscope device 100 includes a controller 110. In the example illustrated in FIG. 4, the display control unit 3 and the imaging control unit 4 control the display unit 21 and the imaging unit 10b, respectively, via the controller 110. However, the display control unit 3 may control the display unit 21 without using the controller 110. Similarly, the imaging control unit 4 may control the imaging unit 10b without using the controller 110.

The control block (in particular, the processing unit 201) of the microscope system 300 may be embodied as a logic circuit (hardware) formed in an integrated circuit (IC chip), or embodied as software.

In the latter case, the microscope system 300 includes a computer that execute a command of a program that is software for performing each function. The computer includes, for example, one or more processors, and a computer-readable recording medium that stores the program. Then, the object of an embodiment is achieved by causing the processor of the computer to read the program from the recording medium and executing the read program. The processors each may be a CPU (Central Processing Unit). Examples of the recording medium include "non-temporary tangible medium" such as a ROM (Read Only Memory), a tape, a disc, a card, a semiconductor memory, and a programmable logic circuit. A RAM (Random Access Memory) from which the program is extracted may be further provided. The program may be supplied to the computer via any transmission medium with which the program can be transmitted (communication network, broadcast wave, or the like). One or more aspects may be implemented in the form of data signal that embodies the program by electronic transmission and is embodied in carrier wave.

Example of Processing of Generating Preview Image

Figure 6:
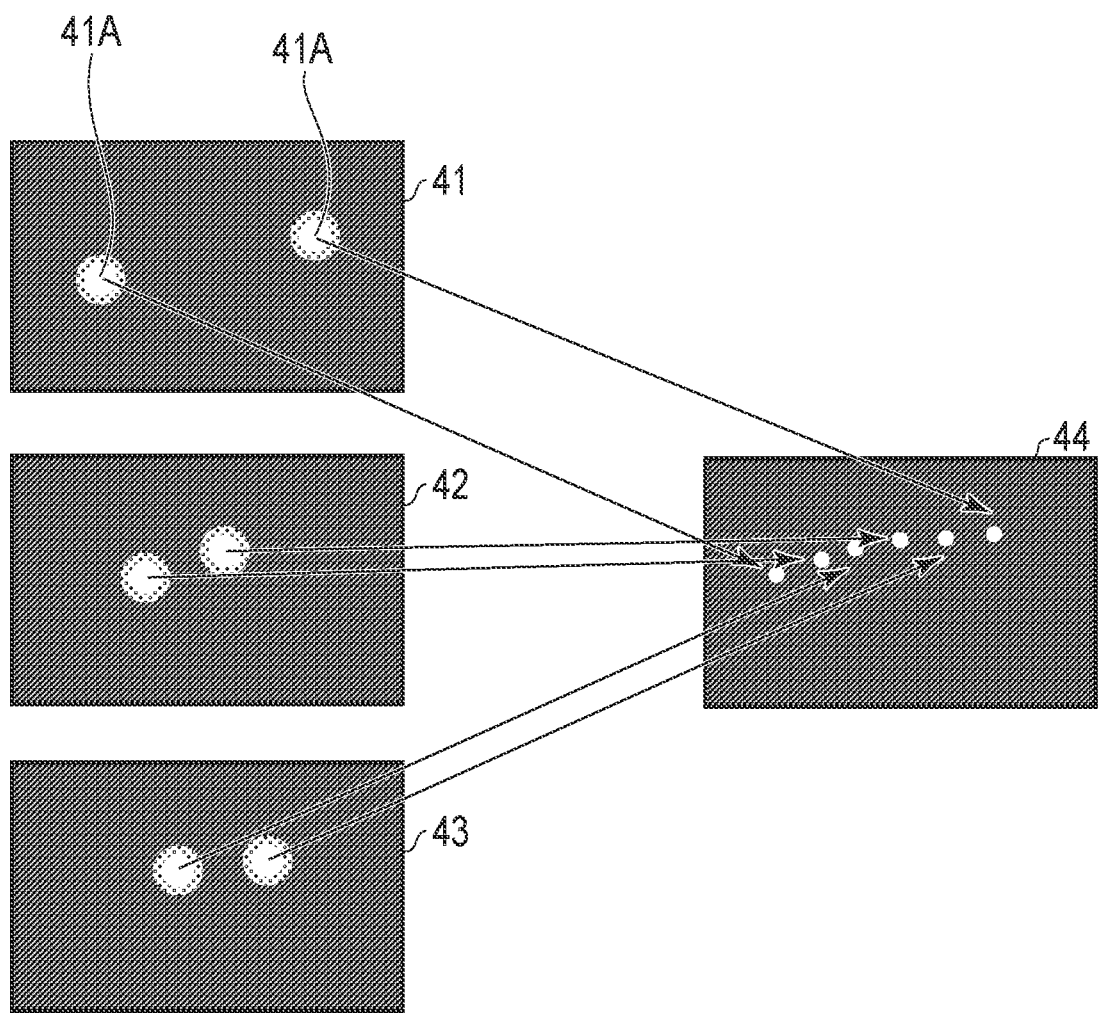
FIG. 6 is a diagram illustrating preview image generation processing of a preview image generation unit.

FIG. 6 is a view for describing preview image generation processing of the preview image generation unit 1. In the example illustrated in FIG. 6, the preview image generation unit 1 generates one preview image 44 based on information extracted from three live images 41 to 43. In practice, for example, one preview image 44 is generated from all live images captured from a construction start timing for a real time super-resolution image to the current time. Alternatively, to reduce a computation load, one preview image may be generated by reducing some live images from the all live images.

The live images 41 to 43 are fluorescent images taken by the imaging unit 10b. Two luminous points (fluorescent luminous points) 41A and 41B are reflected on the live image 41. Similarly, two luminous points are reflected on each of the live images 42 and 43. Each luminous point reflected on the live image is larger than the size of the fluorescent dye molecule due to the effect of the optical system of the microscope device 100. This also applies to each luminous point in each of target images (target images 51 to 53) illustrated in FIG. 7.

First, the preview image generation unit 1 executes filter processing to remove noise from each live image. In following description of the preview image generation processing, unless otherwise specified, each live image with noise removed is merely referred to as live image. Then, the preview image generation unit 1 detects (extracts) luminous points having a brightness of a predetermined threshold value or more from each live image. Then, the preview image generation unit 1 identifies the center (center of gravity) of each luminous point in each live image. That is, information extracted by the preview image generation unit 1 is information about the luminous points in the live image.

Subsequently, the preview image generation unit 1 generates the preview image 44 based on the extraction result of the luminous points in each live image. Specifically, the preview image generation unit 1 maps the center of gravity of each identified luminous point in each live image to a different image. The different image is the preview image 44.

More specifically, the preview image generation unit 1 generates an image obtained by plotting (drawing) a luminous point having size for one pixel, as the preview image 44, at the same coordinates as the center of each luminous point in each live image. Alternatively, the preview image generation unit 1 may plot luminous points having size for plural pixels using the above coordinates as the central point. As illustrated in FIG. 6, six luminous points in the preview image 44 correspond to the luminous points in each live image one-to-one. As described above, the preview image 44 is an image indicating each of luminous points extracted from the live images 41 to 43 (more specifically, the position of each of the luminous points in the live images 41 to 43).

Each luminous point in the preview image 44 is different from each luminous point in each live image and is not blurred. This is due to that, as described above, each luminous point in the preview image 44 is plotted with uniform brightness as size for one or more pixels.

For example, in the preview image generation processing, unlike below-mentioned super-resolution image construction processing, following processing is not executed: template matching; identification of the central position of the luminous point by fitting based on a point spread function; and image correction for a stage drift. Therefore, the preview image generation processing has smaller man-hours (the number of steps) and much smaller computation load than the super-resolution image construction processing. For this reason, the speed of the preview image generation processing is much higher than the speed of the super-resolution image construction processing. That is, the preview image may be obtained within a shorter time than the super-resolution image. However, the preview image generation processing has a lower detection accuracy of the central position of each luminous point than the super-resolution image construction processing.

Example of Processing of Constructing Super-Resolution Image

Figure 7:
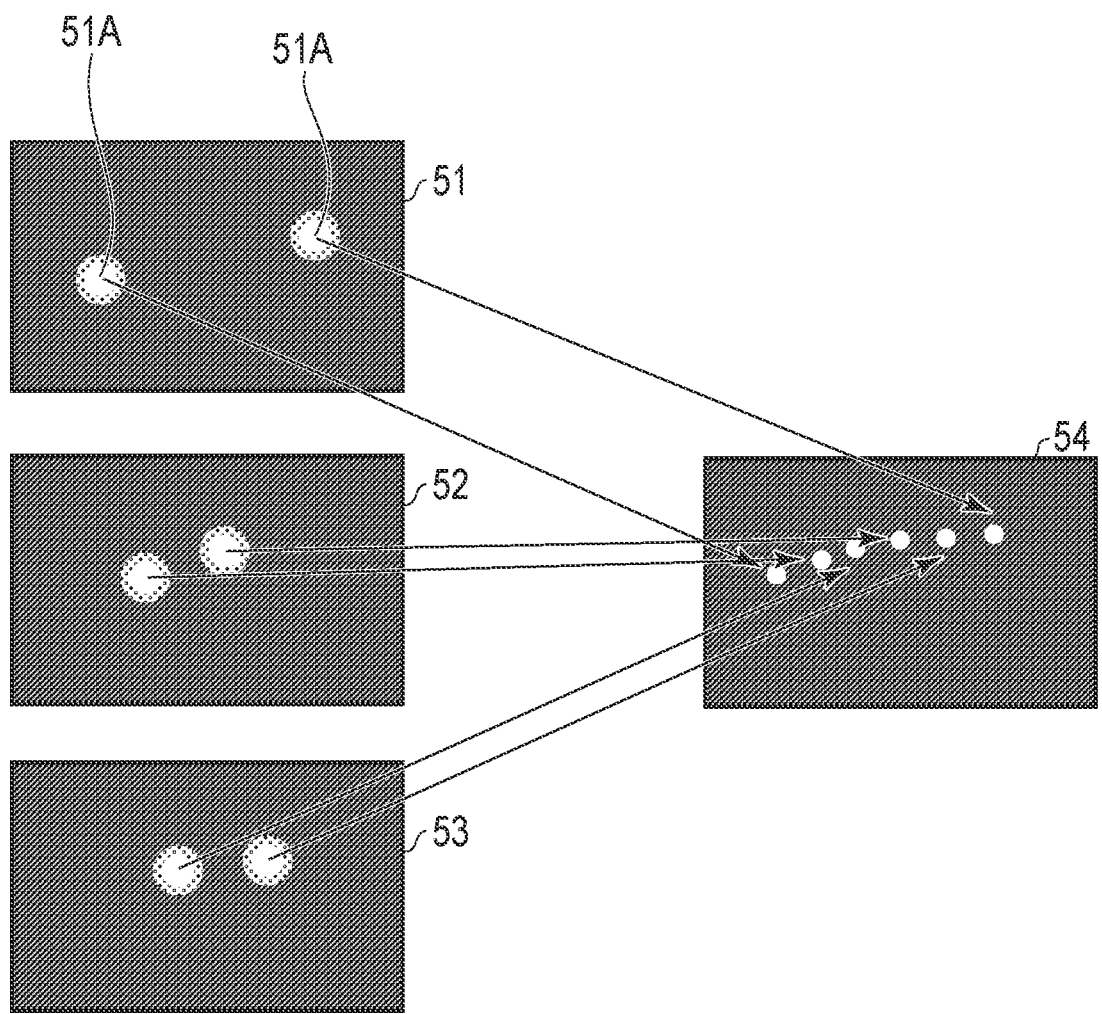
FIG. 7 is a diagram illustrating super-resolution image construction processing of a super-resolution image construction unit.

FIG. 7 is a view for describing the super-resolution image construction processing of the super-resolution image construction unit 2. FIG. 7 pairs with FIG. 6. In the example illustrated in FIG. 7, the super-resolution image construction unit 2 constructs one super-resolution image 54 from three target images 51 to 53. In fact, one super-resolution image 54 is generated from a few hundreds of to a few thousands of target images.

However, the super-resolution image construction unit 2 may construct one super-resolution image 54 from some of the target images. For example, the super-resolution image construction unit 2 may also construct the super-resolution image 54 corresponding to each region based on only a predetermined region in each target image. The super-resolution image construction unit 2 may construct one super-resolution image 54 from at least at least part of the target image.

Like the live images 41 to 43, the target images 51 to 53 are fluorescent images taken by the imaging unit 10b. Two luminous points (fluorescent luminous points) 51A and 51B are reflected on the target image 51. Similarly, two luminous points are reflected on each of the target images 52 and 53. As illustrated in FIG. 6 and FIG. 7, the position of each luminous point reflected on each target image is substantially the same as the position of each luminous point reflected on each live image.

First, the super-resolution image construction unit 2 removes noise from each target image based on background image information. In following description of the super-resolution image construction processing, unless otherwise specified, each target image with noise removed is merely referred to as target image.

Then, the super-resolution image construction unit 2 extracts the luminous points reflected on the target image from each target image by template matching. Subsequently, the super-resolution image construction unit 2 applies fitting based on a point spread function to each luminous point. By performing such fitting, the central position of the luminous points in each target image may be accurately identified in unit of molecule.

Subsequently, the super-resolution image construction unit 2 determines whether or not each luminous point is a proper luminous point based on a fitting result based on the point spread function. Specifically, the super-resolution image construction unit 2 checks the fitting result to determine whether or not each luminous point satisfies a predetermined determination standard. The super-resolution image construction unit 2 identifies only the luminous point that satisfies the determination standard as the luminous point in each target image.

Subsequently, the super-resolution image construction unit 2 corrects a drift of the stage during imaging. After that, the super-resolution image construction unit 2 constructs (generates) the super-resolution image 54. Specifically, the super-resolution image construction unit 2 plots the luminous points in each target image on a different image while applying blurring. The different image is the super-resolution image 54. By blurring, each luminous point in the super-resolution image 54 may be made bright so as to resemble the actual luminous point.

As described above, the super-resolution image 54 having a resolution exceeding a limit may be obtained by combining target images (fluorescent images) in which the positions of the luminous points are identified with an accuracy in unit of molecule.

In the above-described example, the super-resolution image construction unit 2 adds blurring to each luminous point in the super-resolution image 54. However, the super-resolution image construction unit 2 may draw each luminous point in the super-resolution image 54 so as not to add blurring to each luminous point.

Data on the super-resolution image has a resolution of about a few pixel squares to tens of thousands of pixel squares. Here, since the display area of the super-resolution image may be made larger as the size of the display unit 21 is larger, the area of the display unit 21 is preferably large. Especially, the area of the second display region 32 is preferably as large as possible.

The super-resolution image construction processing has more man-hours and much larger computation load than the above-described preview image generation processing. For this reason, the speed of the super-resolution image construction processing is slower than the speed of the preview image generation processing. However, the super-resolution image construction processing has a lower detection accuracy of the central position of each luminous point than the preview image generation processing.

Therefore, the super-resolution image construction processing requires a relatively long time, for example, a few tens of seconds to a few minutes. On the other hand, the intensity of the fluorescence exhibited by fluorescent dye molecules lowers relatively soon with time. For this reason, to construct a suitable super-resolution image, each target image needs to be taken within a short time. Accordingly, each target image is preferably a continuous image of the sample, which are continuously taken within a short time.

As described above, both the preview image 44 and the super-resolution image 54 are images generated so as to reflect the position of each luminous point in the fluorescent image. For this reason, the preview image 44 has the substantially same display contents as the super-resolution image 54. Therefore, the preview image 44 may be used as the pseudo super-resolution image for previously predicting the display contents of the super-resolution image 54.

(Sequence of Processing in First Stage)

Figure 8:
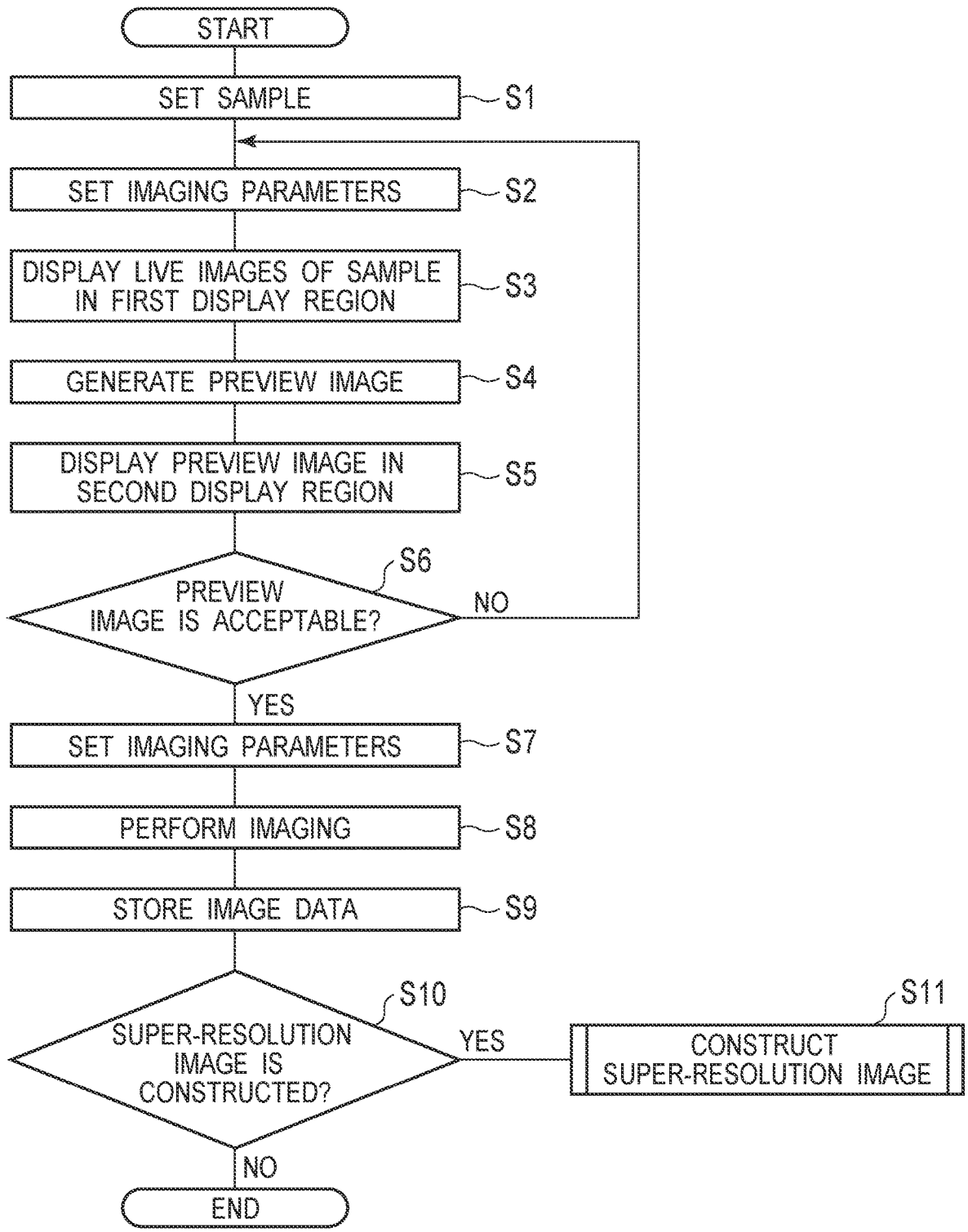
FIG. 8 is a flow diagram illustrating a sequence of processing in a first stage.

FIG. 8 is a flowchart illustrating a sequence of processing in the first stage.

In Step S1, the user sets a sample (that is, object to be imaged) on the sample placement unit 11. The processing in Step S1 is specifically described below.

First, if the user presses a predetermined button (ex.: BT1 in FIG. 5) displayed on the display unit 21, the microscope system 300 shifts to the first stage. On pressing of the BT1, the display control unit 3 changes the display screen of the display unit 21 to a basic screen. The BT1 is a button for shifting the microscope system 300 to the first stage, and is referred to as a "Capture Image" button, for example.

A button for changing the position of the movable unit 20 (cover open/close button) (not illustrated) is displayed on the display unit 21. When the user presses the cover open/close button, the movable unit 20 located at the shading position is moved to the opening position. Subsequently, the user sets the sample (that is, object to be imaged) on the opened sample placement unit 11. On completion of setting, when the user presses the cover open/close button again, the microscope system 300 moves the movable unit 20 located at the opening position to the shading position.

In Steps S2 and S3, the imaging unit 10b takes a plurality of live images of the sample, and displays the live images in the first display region 31. The processing in Step S2 is specifically described below. It is assumed that a button for setting imaging conditions of the imaging unit 10b (imaging condition setting button) (not illustrated) is displayed on the display unit 21.

In Step S2, when the user presses the imaging condition setting button, the processing unit 201 sets various imaging parameters. The imaging parameters are various parameters indicating conditions for imaging of the imaging unit 10b. Examples of the imaging parameters include:

the conditions for the light source for preview image generation (the type of the light source, the wavelength of incident light, the intensity of incident light);

the imaging range or area (the imaging range or area of the sample);

the exposure time (the exposure time of the imaging unit 10b);

the contrast (the contrast of the live image displayed in the first display region 31);

the display scale (the display scale of the first display region 31);

the position of the sample placement unit 11 (stage 11a) (in other words, movement);

the conditions for the light source for super-resolution image construction (the type of the light source, the wavelength of incident light, the intensity of incident light, and the number of frames of the target images to be imaged); and the viewing field (viewing field at imaging).

However, the imaging parameters are not limited to the above-mentioned examples and other imaging parameters may be provided. A dialogue screen for allowing the user to set imaging conditions may be displayed on the display unit 21.

After setting of the imaging conditions, when the user presses a predetermined button (ex.: BT4 in FIG. 5) discharged on the display unit 21, the imaging unit 10b takes an image. The BT4 is a button for receiving an instruction to start imaging of the imaging unit 10b, and is referred to as "imaging" button, for example. On pressing of the BT4, the imaging unit 10b images the live image using a light source for preview image generation designated by imaging parameters. A laser element is used as the light source for preview image generation. By using the laser element as the light source, the live image may be captured as the fluorescent image. Then, in Step S3, the display control unit 3 displays the live image taken by the imaging unit 10b in the first display region 31.

To previously consider the imaging conditions, the user may confirm the bright field image before confirmation of the live image. In such case, by using the LED element as the light source, the imaging unit 10b may take the bright field image. Then, the bright field image taken by the imaging unit 10b may be displayed in the first display region 31.

In Step S4, the preview image generation unit 1 generates the preview image from the live image. When the user presses a predetermined button (ex.: BT3 in FIG. 5) displayed on the display unit 21, the preview image generation unit 1 starts to generate the preview image. The BT3 is a button for allowing the preview image generation unit 1 to generate the preview image, and is referred to as a "Real-time" button, for example. On pressing of the BT4, extraction of the luminous points in each live image is started. Then, the preview image generation unit 1 generates the preview image based on an extraction result of each luminous point in each live image.

In Step S5, the display control unit 3 displays the preview image generated by the preview image generation unit 1 in the second display region 32. In Step S4, the user may refer to the preview image. Thus, the user may predict display contents of the super-resolution image constructed in the second stage. In Step S5, by allowing the user to refer to the preview image displayed in the second display region 32, the user may determine whether or not the preview image is acceptable (that is, the preview image is a target image).

In Step S6, the operation of the user who determines whether or not the preview image is acceptable is received. If the user who determines that the preview image is acceptable (that is, the preview image is a target image) makes a predetermined input (for example, pressing of a "OK" button) (YES in Step S6), the procedure proceeds to Step S7. On the other hand, if the user who determines that the preview image is unacceptable (that is, the preview image is not a target image) makes a predetermined input (for example, pressing of "Problem" button) (NO in Step S6), the procedure returns to Step S2, and the same processing is repeated. Thereby, imaging conditions including the viewing field, the range of the sample to be imaged, the exposure time, the type of light source, and so forth may be repeatedly reset until the proper preview image is taken.

As described above, by allowing the user to confirm the preview image in the first stage prior to the second stage, the possibility that an improper super-resolution image is constructed in the second stage may be decreased. Therefore, since the possibility of requiring taking of the target image and construction of the super-resolution image may be decreased, the super-resolution image may be obtained more efficiently than conventional. That is, time to require the super-resolution image may be decreased than conventional.

In Step S7, after it is confirmed that the preview image is acceptable, the imaging conditions (imaging parameters) are reset. Specifically, if it is confirmed that the preview image is acceptable in Step S6, the imaging conditions are reset so as to be suitable for taking of the target image in Step S7. When the user presses the imaging condition setting button, the processing unit 201 resets the imaging conditions. If the imaging conditions set in Step S2 to obtain the preview image are used without being changed as the imaging conditions for capturing the target image, Step S7 may be omitted.

In Step S8, the target image is taken under the reset imaging conditions. Specifically, when the user presses the BT4, the imaging unit 10b takes a plurality of target images. As described above, the first stage includes a step of inputting an instruction to take the target images based on the preview image (imaging for constructing the super-resolution image). In the state where fluorescent dyes blink, the imaging unit 10b continuously takes the images of the sample. Hereinafter, the continuously taken images of the sample is referred to as "continuous image". In this case, each target image is each frame (image frame) constituting the continuous image. Since the time interval at the fluorescent dyes blink is a few milliseconds to a few tens of milliseconds, the imaging interval of the continuous image may be set to 30 milliseconds to 100 milliseconds. The fluorescence exhibited by one fluorescent dye molecule only needs to be imaged at least once.

In Step S9, the imaging unit 10b stores the taken target images (more strictly, data on the target image) in the storage unit 202.

In Step S10, the user determines whether or not the super-resolution image is to be constructed (whether or not the procedure proceeds to the second stage). If the user wishes to proceed to the second stage, the user presses a predetermined button displayed on the display unit 21 (ex.: BT2 in FIG. 5) (YES in Step S10), and the microscope system 300 starts a series of processing for constructing the super-resolution image. That is, the procedure proceeds to Step S11. Step S11 collectively represents the processing in the second stage. The contents of the processing in Step S11 is specifically described below (see FIG. 10). The BT2 is a button for shifting the microscope system 300 from the first stage to the second stage, and is referred to as "Process Image" button, for example.

On the other hand, if the user does not wish to proceed to the second stage, the user does not press the BT2. In this case, the procedure does not proceed to the second stage and according to a predetermined operation of the user (NO in Step S10), the processing in the first stage is terminated. For example, when the user presses the cover open/close button again, the microscope system 300 moves the movable unit 20 located at the shading position to the opening position. Then, the user removes the sample from the sample placement unit 11 in the opened state. This terminates the processing in the first stage.

(Sequence of Processing in Second Stage)

Figure 9:
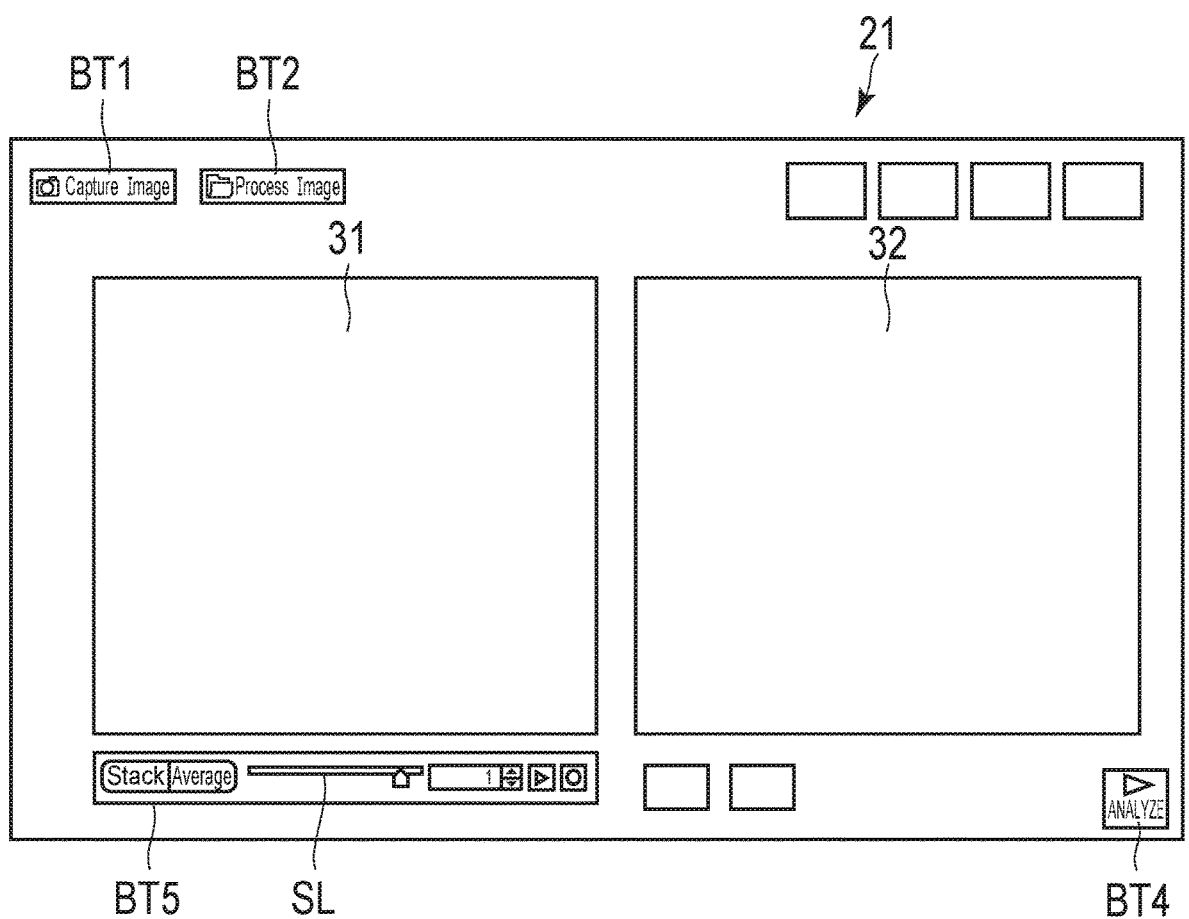
FIG. 9 is a diagram illustrating an example of layout of a display unit in a second stage.

FIG. 9 is a view illustrating an example of layout of the display unit 21 in the second stage. As illustrated in FIG. 9, like the display screen in the first stage, the display screen of the display unit 21 in the second stage includes the first display region 31 and the second display region 32. Various buttons displayed on the display screen in the second stage are different from the buttons displayed on the display screen in the first stage.

Figure 10:
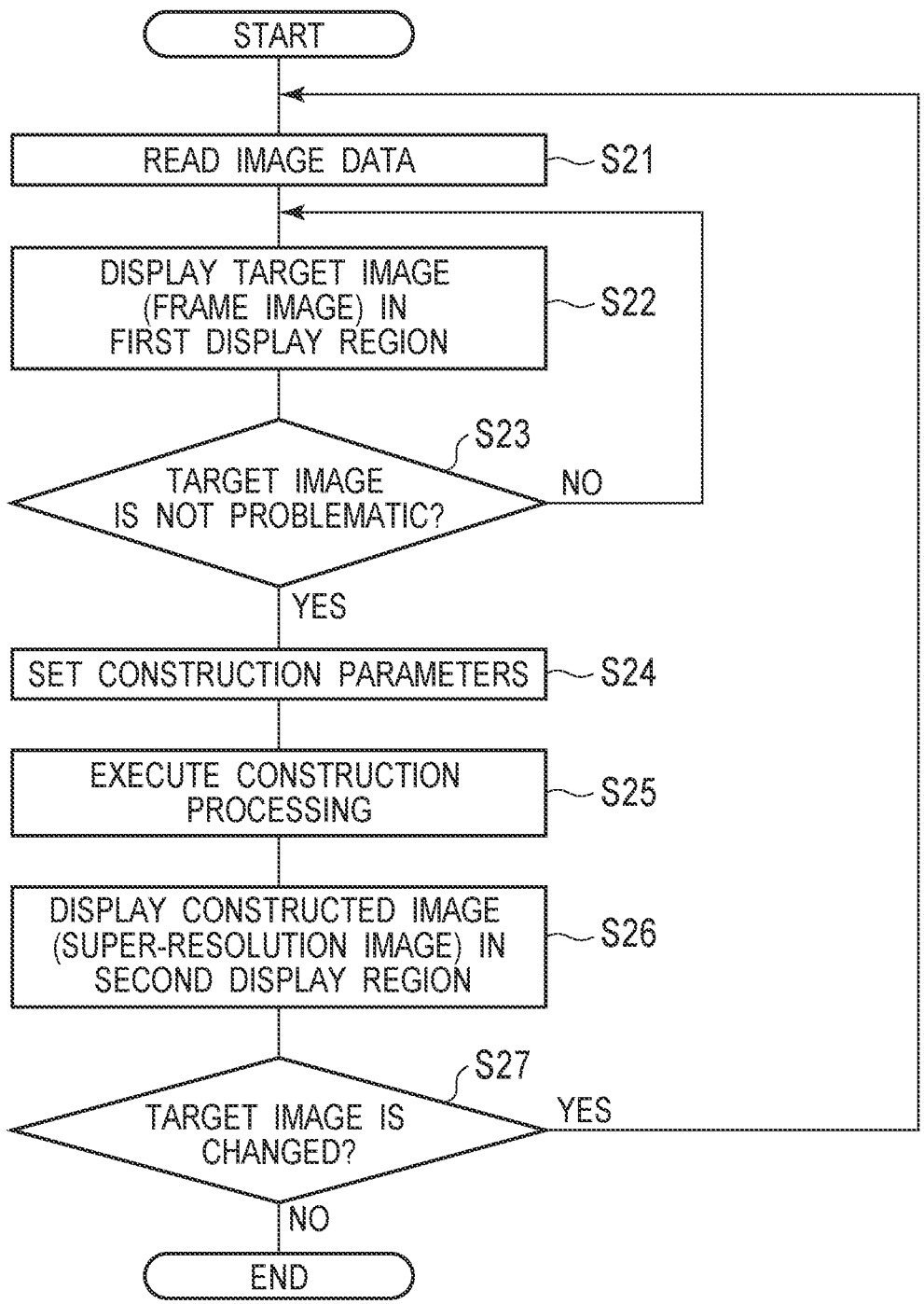
FIG. 10 is a flow diagram illustrating a sequence of processing in a second stage.

FIG. 10 is a flowchart illustrating a sequence of processing in the second stage. FIG. 10 illustrates contents of the processing in Step S10 in FIG. 8 more specifically. Prior to Step S21, when the user presses the B2 (Step S9 in FIG. 8), the display control unit 3 changes the display screen of the display unit 21 to an analysis screen for constructing the super-resolution image.

In Step S21, the super-resolution image construction unit 2 reads the target images stored in the storage unit 202.

In Step S22, the display control unit 3 displays the target image read from the storage unit 202 in the first display region 31. As an example, when the user operates a predetermined button (ex.: BT5 in FIG. 9), the display control unit 3 displays one predetermined target image among a plurality of target images in the first display region 31. The user may operate the BT5 to designate a frame number of the continuous image to be displayed, and the processing unit 201 may receive the designated frame number. For example, the BT5 includes a slider bar (SL) that sequentially displaying each frame constituting the continuous image in an automatic manner. The user may slide the SL to designate an initial frame number to be displayed.

Alternatively, the processing unit 201 may also receive information designating a plurality of image frames included in the continuous image from the user. In this case, the processing unit 201 may average the designated image frames to generate an averaged image. The display control unit 3 may display the averaged image in the first display region 31. Displaying the averaged image is only an example, and the display control unit 3 may display a composite image obtained by combining the plurality of target images in the first display region 31.

In the second stage, it is assumed that a button (construction condition setting button) (not illustrated) for setting construction conditions for the super-resolution image (processing conditions for constructing the super-resolution image) is displayed on the display unit 21. Accordingly, in Step S22, the user may set the construction conditions. When the user presses the construction condition setting button, the processing unit 201 sets various construction parameters. Examples of the construction parameters include:

the construction range (the target range (region) for the super-resolution image in each target image); and the frame number (the range of the target frame number for construction of the super-resolution image).

However, the construction parameters are not limited to the above-described examples, and may be other construction parameters. A dialogue screen for allowing the user to set the construction conditions is displayed on the display unit 21.

At least part of the target images only needs to be displayed in the first display region 31. Alternatively, a composite image obtained by combining the target images may be displayed in the first display region 31. The above-described averaging is an example of composite processing. That is, the above-described averaged image is an example of the composite image.

In Step S23, the user refers to the target image displayed in the first display region 31 and determines whether or not the target image is unacceptable. If the user determines that the target image is acceptable, and the user makes a predetermined input (for example, pressing of the "OK" button) (YES in Step S23), the procedure proceeds to Step S24. On the other hand, if the user determines that the target image is unacceptable and the user makes a predetermined input (for example, pressing of the "Problem" button) (NO in Step S23), the procedure returns to Step S22 and the same processing is repeated. Thereby, the construction conditions may be repeatedly reset until a proper target image is displayed.

The target image displayed in the first display region 31 in Step S23 is said to be an image for roughly predicting display contents of the super-resolution image to be constructed in Step S25. For this reason, by causing the user to confirm the target image prior to the construction of the super-resolution image, the possibility of constructing an improper super-resolution image in Step S25 may be decreased. Accordingly, since the possibility of resuming to construct the super-resolution image may be decreased, the super-resolution image may be obtained more efficiently than conventional. Also, in this connection, time to obtain the super-resolution image may be reduced than conventional.

Even when a portion of the target image or the composite image is displayed in the first display region 31, the user may determine whether or not the target image is acceptable. This is due to that both a portion of the target image and the composite image include display contents that are similar to the contents of the target image.

After the user confirms that the target image is acceptable (YES in Step S23), the construction conditions (each construction parameter) are reset in Step S24. Specifically, in Step S24, the construction conditions are reset so as to be suitable for constructing the super-resolution image. When the user presses the construction condition setting button, the processing unit 201 resets the construction conditions. If it is not necessary for changing the construction conditions set in Step S22, Step S24 may be omitted.

In Step S25, the super-resolution image construction processing is executed under the reset construction conditions. Specifically, when the user presses a predetermined button (ex.: BT6 in FIG. 8), the super-resolution image construction unit 2 starts the super-resolution image construction processing. BT6 is a button for causing the super-resolution image construction unit 2 to start the super-resolution image construction processing, and is referred to as an "Analyze" button.

In Step S26, the display control unit 3 displays the super-resolution image generated by the super-resolution image construction unit 2 in the second display region 32.

In Step S27, the user refers to the super-resolution image displayed in the second display region 32, and determines whether or not the super-resolution image is acceptable. More specifically, the user refers to the super-resolution image and determines whether or not the target image needs to be changed. If the user determines that the target image need not be changed, and the user makes a predetermined input (for example, pressing of a "Target Image Change Unnecessary" button) (NO in Step S27), the processing in the second stage is finished. On the other hand, if the user determines that the target image needs to be changed, and the user makes a predetermined input (for example, pressing of a "Target Image Change Necessary" button (YES in Step S27), the procedure returns to Step S21, and the same processing is repeated. Thereby, selection of the target image and setting of the construction conditions may be repeatedly performed until a suitable super-resolution image is constructed.

[Modification]

Figure 11:
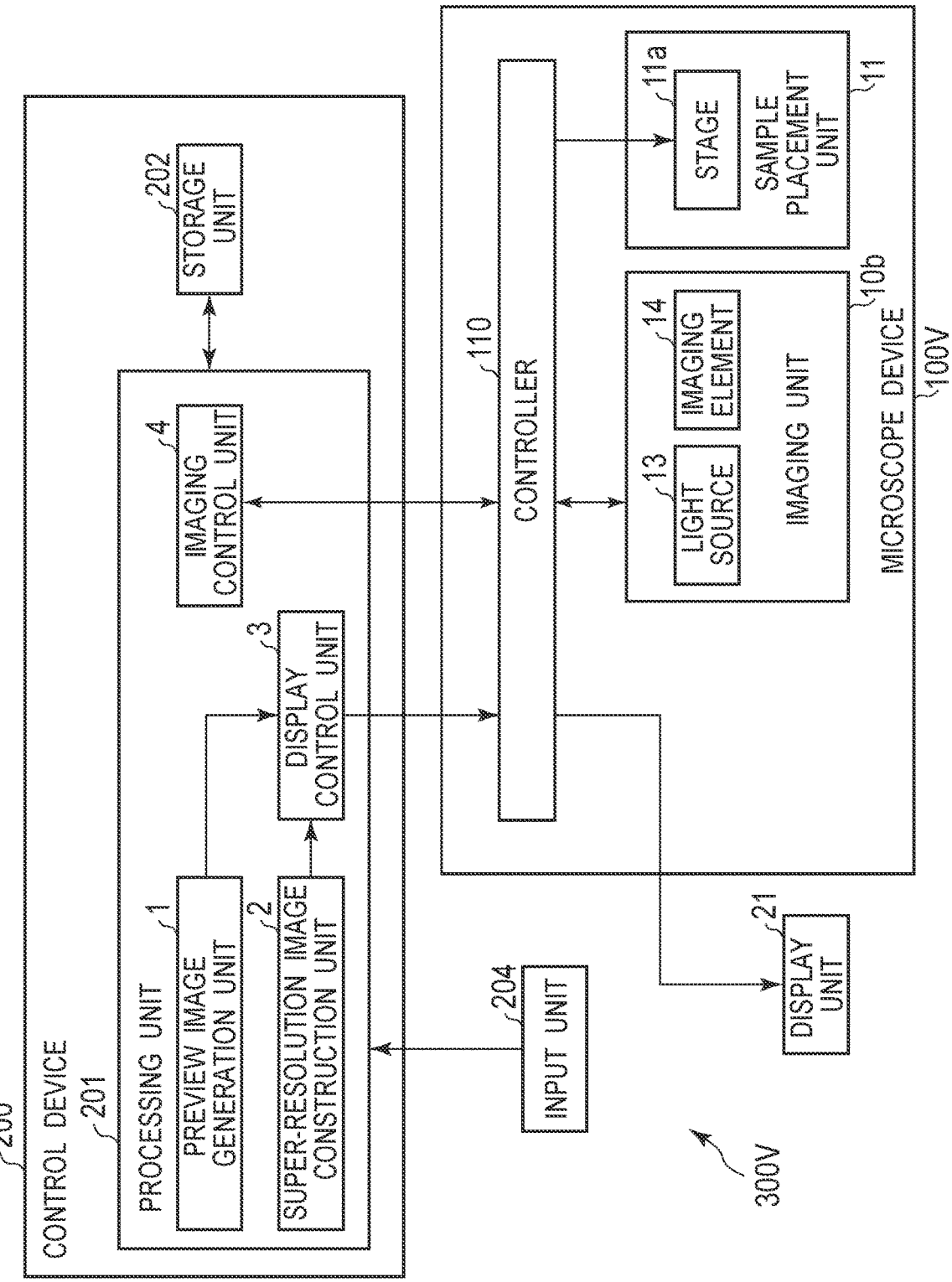
FIG. 11 is a functional block diagram schematically illustrating a configuration of a microscope system in a modification of an embodiment 1.

FIG. 11 is a functional block diagram illustrating one modification of the microscope system 300. The microscope system illustrated in FIG. 11 is referred to as a microscope system 300V. The microscope system 300V includes a microscope device 100V. In the microscope system 300V, unlike the microscope system 300, the microscope device 100V and the display unit 21 are provided as separate bodies (separate devices). That is, the microscope device 100V, unlike the microscope device 100, does not include the display unit 21. The microscope device 100V is communicable connected to the display unit 21. As described above, in the microscope system of an embodiment, it is no need to integrate the display unit 21 with the microscope device 100.

Embodiment 2

An embodiment 2 is described below. For convenience of description, members having the same functions as those in an embodiment 1 are given the same reference numerals and description thereof is omitted.

FIG. 12 is a flowchart illustrating a sequence of another processing of the microscope system 300. As illustrated in FIG. 11, the microscope system 300 may select one of three modes: normal imaging mode, large-viewing field fluorescence imaging mode, and multi-viewing field imaging mode. In this case, the processing unit 201 receives a user's instruction about the imaging mode via the input unit 204 (Step S30).

If the normal imaging mode is selected, imaging for obtaining the super-resolution image is made using a region set according to the user's instruction as one viewing field (Step S70).

FIG. 13 is a flowchart illustrating an example of a sequence of processing in the large-viewing field fluorescence imaging mode. If the large-viewing field fluorescence imaging mode is selected in Step S30 in FIG. 12, a series of processing in FIG. 13 is executed (Step S40 in FIG. 12).

The large-viewing viewing field fluorescence imaging mode is a function of achieving a zoom function built in typical microscopes by imaging in a plurality of viewing fields. As illustrated in FIG. 12, in the large-viewing field fluorescence imaging mode, the control device 200 receives an input of the number of viewing fields determined by the user (Step S41). For example, 10×10, 5×5, 2×2, 1 or the like may be set as the number of viewing fields. As the number of viewing fields increases, the imaging range enlarges.

When an instruction to start imaging is received from the user (Step S42), the imaging control unit 4 controls the imaging unit 10b by moving the stage 11a while moving the viewing field to each set position, to take fluorescent images (Step S43). That is, the imaging control unit 4 takes a predetermined number of fluorescent images while moving the imaging position of the imaging unit 10b. The display control unit 3 generates a large-viewing field fluorescent image using a predetermined number of fluorescent images in each viewing field.

Figure 14A:
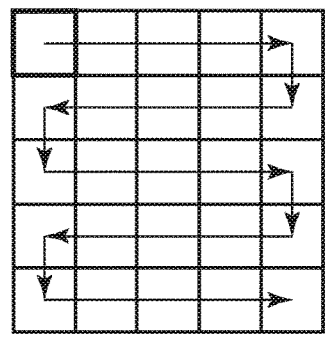
FIG. 14A and FIG. 14B are diagrams each illustrating an example of a method of moving a viewing field.
Figure 14B:
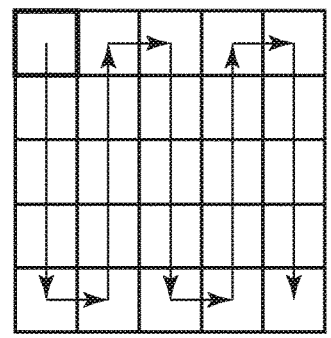

FIG. 14A and FIG. 14B are views illustrating an example of a method of moving the viewing field. FIG. 14A and FIG. 14B illustrate the example in which the viewing fields set to 5×5 are moved. As illustrated in FIG. 14A, the viewing field may be moved in the lateral direction. As illustrated in FIG. 14B, the viewing field may be moved in the longitudinal direction. The moving order of the viewing field is not limited to these examples and may be freely changed. For example, the viewing field may be moved in a circle manner, or the viewing field may be non-consecutively moved.

On completion of imaging, the display control unit 3 displays the large-viewing field fluorescent image obtained by combining the preview images in the viewing fields in the display unit 21 (Step S44).

Figure 15:
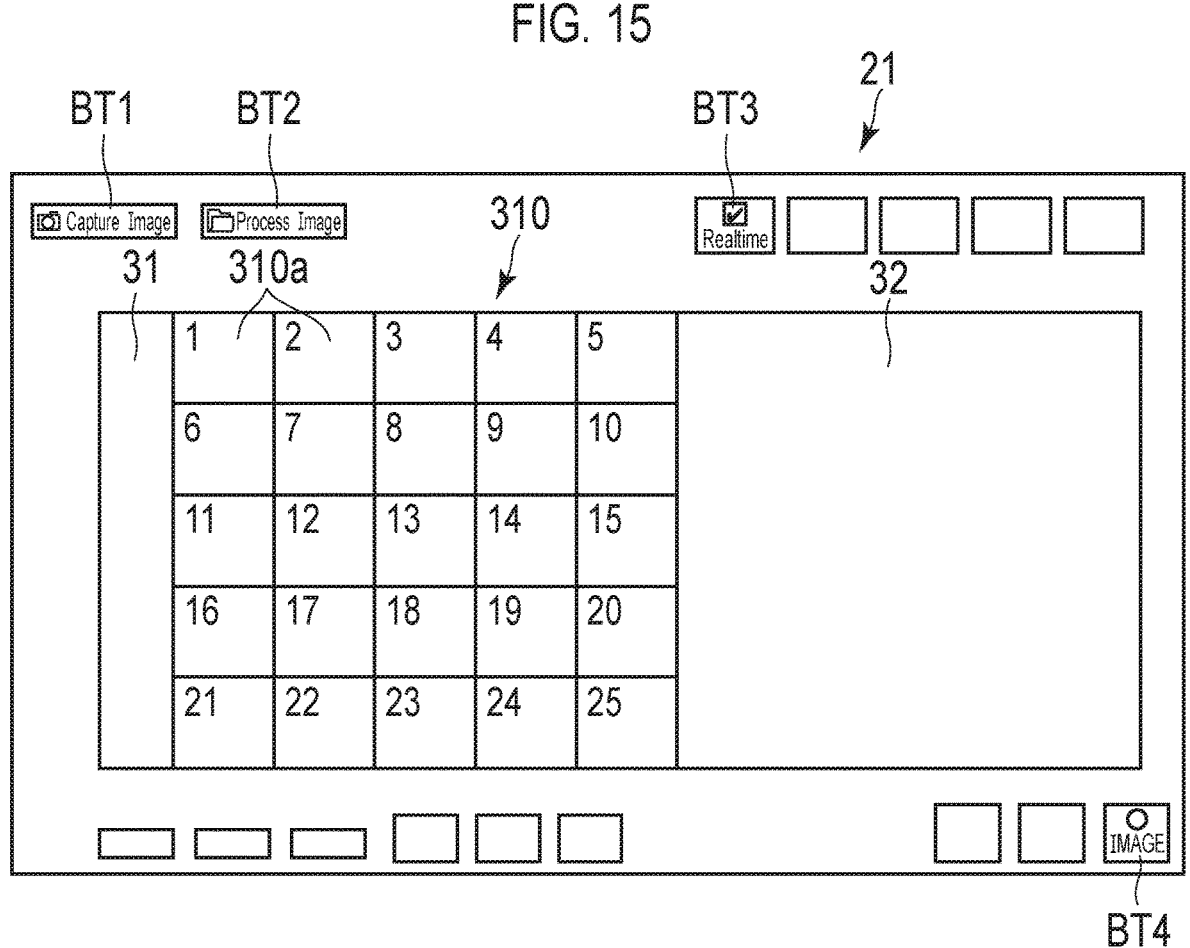
FIG. 15 is a diagram illustrating an example of a screen on which preview images in viewing fields are displayed.

FIG. 15 is a view illustrating an example of a screen on which the preview images in the viewing fields are displayed. As illustrated in FIG. 15, the large-viewing field fluorescent image is displayed in a pop-up region 310. FIG. 15 illustrates the 5×5 viewing fields. A serial number may be displayed in a fluorescent image 310a in each viewing field. The serial number may be switched between display and non-display. The display control unit 3 displays the magnified fluorescent image 310a by receiving information designating the fluorescent image 310a in each viewing field from the user. For example, the user double-clicks on the fluorescent image 310a to display the magnified fluorescent image 310a. The large-viewing field fluorescent image may be displayed in both the pop-up region 310 and the first display region 31. Alternatively, the large-viewing field fluorescent image may be displayed only in the first display region 31.

In Step S45, the processing unit 201 receives the designation of the viewing field for imaging for construction of the super-resolution image (hereinafter is abbreviated as super-resolution imaging) on the large-viewing field fluorescent image. The region to be imaged by super-resolution imaging is designated by receiving the designation of the viewing field. Specifically, the display control unit 3 allows the GUI for receiving an input of the designation of the viewing field to be displayed on the display unit 21. The GUI includes the fluorescent image 310a. For example, in Step S45, the user clicks the fluorescent image 310a corresponding to the viewing field for super-resolution imaging among the plurality of viewing fields, thereby designating the desired viewing field. In Step S45, the designation of the viewing field that is not a target for super-resolution image may be received.

When receiving information indicating the region for super-resolution imaging and then, an instruction to start imaging from the user (Step S46), the imaging control unit 4 controls the imaging unit 10b while moving the viewing field to each set position to perform super-resolution imaging (Step S47).

The display control unit 3 stores the image obtained by super-resolution imaging in the storage unit 202. The display control unit 3 may display the image, for example, in the pop-up region 310 (Step S48).

By performing super-resolution imaging only in the viewing field suitable for the construction of the super-resolution image among the plurality of viewing fields in this manner, the imaging time may be reduced. In addition, subsequent processing time for the construction of the super-resolution image may be reduced.

Figure 16:
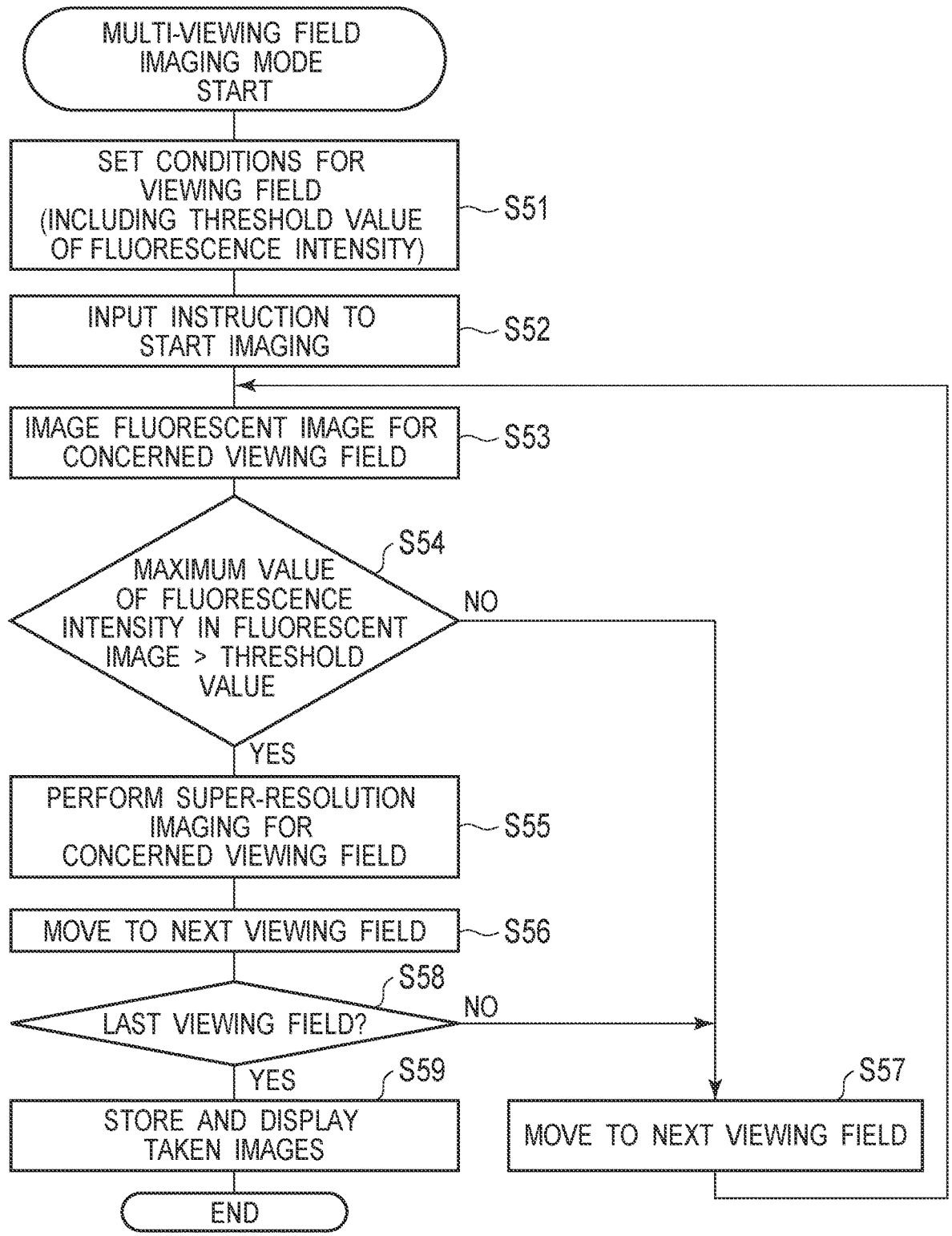
FIG. 16 is a flow diagram illustrating a sequence of processing in a multi-viewing field imaging mode.

FIG. 16 is a flowchart illustrating an example of a sequence of processing in the multi-viewing field imaging mode. If the multi-viewing field imaging mode is selected in Step S30 in FIG. 12, a series of processing in FIG. 16 is executed (Step S50 in FIG. 12).

The multi-viewing field imaging mode is a mode for continuously performing imaging and super-resolution imaging for tiling in the viewing fields in a previously designated range. The user may set the number of times and interval of the movement of the stage 11a, moving direction, and execution conditions for super-resolution imaging, thereby automatically performing imaging in the plurality of viewing fields.

As illustrated in FIG. 16, in the multi-viewing field imaging mode, first, the user sets conditions for the viewing field (Step S51). The imaging control unit 4 receives information indicating the set conditions. The conditions include the moving direction and the number of times (the number of viewing fields) of the stage 11a, and a below-mentioned threshold value of the fluorescence intensity. An example of the moving direction of the stage 11a is illustrated in FIG. 14A and FIG. 14B.

When receiving the instruction to start imaging from the user (Step S52), the imaging control unit 4 controls the imaging unit 10b so as to move the stage 11a while moving the viewing field to each set position, thereby taking the fluorescent image (Step S53).

At this time, the imaging control unit 4 compares a maximum value of the fluorescence intensity with a threshold value of fluorescence intensity in the taken fluorescent image (Step S54). For example, the imaging control unit 4 may find the maximum values of the fluorescence intensity in a predetermined number of fluorescent images and average the found maximum values to calculate the maximum value to be compared with the threshold value of the fluorescence intensity. If the maximum value of the fluorescence intensity in the fluorescent image is larger than the threshold value of the fluorescence intensity (YES in Step S54), the imaging control unit 4 performs super-resolution imaging for the viewing field (Step S55). That is, the imaging control unit 4 detects the fluorescence intensity in each viewing field while moving the imaging viewing field of the imaging unit 10b, and takes a plurality of images for constructing the super-resolution image in the imaging viewing field in which the larger fluorescence intensity than the predetermined threshold value is detected. On completion of super-resolution imaging, the imaging control unit 4 moves the viewing field to be imaged to the next viewing field (Step S56). Then, the imaging control unit 4 determines whether or not the viewing field to be imaged is the last viewing field (Step S58).

If the maximum value of the fluorescence intensity in the fluorescent image is equal to or smaller than the threshold value of the fluorescence intensity (NO in Step S54), the imaging control unit 4 moves the next viewing field without performing super-resolution imaging for the viewing field (Step S57).

When the user determines whether or not super-resolution imaging is proper for all of the set viewing fields (YES in Step S58), the display control unit 3 stores the image obtained by super-resolution imaging in the storage unit 202. The display control unit 3 may display the image in the pop-up region 310 (Step S59).

By performing super-resolution imaging only for the viewing field having the larger maximum value of the fluorescence intensity than the threshold value of the fluorescence intensity in the fluorescent image among the plurality of viewing fields, the imaging time may be reduced. In addition, subsequent processing time for the construction of the super-resolution image may be reduced.

The user may confirm the preview image in the normal mode to determine whether or not the sample is a target for super-resolution imaging and then, perform the large-viewing field fluorescence imaging mode, the multi-viewing field imaging mode, or the both. In this manner, the sample and the viewing field intended for super-resolution imaging may be identified more efficiently.

[Addition]

The present invention is not limited to each of the above-described embodiments and may be variously modified within the scope recited in CLAIMS or disclosed in the disclosure. Any embodiment including an appropriately combination of the technical means disclosed in the different embodiments fall within the technical scope of the present invention.

The invention claimed is:

1. A method of controlling a microscope system comprising an imaging unit configured to image a sample, and a display unit comprising a first display region and a second display region, the method comprising:
   sequentially displaying, in the first display region, first images sequentially captured by the imaging unit;
   displaying, in the second display region, a second image generated based on information extracted from the sequentially captured first images; and
   sequentially capturing, by the imaging unit, third images to construct a super-resolution image, wherein
   the second image comprises a preview image schematically reproducing the super-resolution image.

2. The method of controlling the microscope system according to claim 1, further comprising: applying first processing to the first images to generate the second image; and applying second processing different from the first processing to the third images to construct the super-resolution image.

3. The method of controlling the microscope system according to claim 2, wherein
   the second processing comprises extracting a luminous point from the third images by template matching, and
   the first processing comprises not extracting the luminous point from the first images by the template matching.

4. The method of controlling the microscope system according to claim 3, wherein
   the second processing comprises identifying a central position of the extracted luminous point by fitting based on a point spread function, and
   the first processing comprises not identifying the central position of the luminous point by fitting based on the point spread function.

5. The method of controlling the microscope system according to claim 2, wherein
   the second processing comprises correcting a stage drift during the imaging, and
   the first processing comprises not correcting the stage drift during the imaging.

6. The method of controlling the microscope system according to claim 1, further comprising:
receiving an input to change a first imaging condition after displaying the second image in the second display region; and
capturing the first images under the changed first imaging condition in response to receiving the input to change the first imaging condition.

7. The method of controlling the microscope system according to claim 6, further comprising:
receiving an instruction to capture third images for constructing a super-resolution image after displaying the second image in the second display region.

8. The method of controlling the microscope system according to claim 7, further comprising:
receiving an input of a second imaging condition to be used with the first imaging condition to capture the third images after receiving the instruction.

9. The method of controlling the microscope system according to claim 8, wherein
the first imaging condition comprises an area of the sample to be imaged, an exposure time, and a type of a light source for the imaging; and
the second imaging condition comprises the number of the third images.

10. The method of controlling the microscope system according to claim 7, wherein
the third images comprise continuous images captured by continuously imaging the sample.

11. The method of controlling the microscope system according to claim 7, further comprising:
receiving, as a processing condition for constructing the super-resolution image, at least one of:
information designating a region in the third images to be used for the construction; or
information specifying images among the third images to be used for the construction.

12. The method of controlling the microscope system according to claim 7, further comprising:
displaying, on the display unit, at least part of the third images or a composite image obtained by composing the third images;
constructing the super-resolution image using at least part of the third images; and
displaying the constructed super-resolution image on the display unit.

13. The method of controlling the microscope system according to claim 7, wherein
the third image comprises a fluorescent image, and
the method further comprises:
detecting a fluorescence intensity at each imaging position of the imaging unit while changing the imaging position, and
capturing the third image at the imaging position in which the fluorescence intensity is detected to be larger than a predetermined threshold value.

14. The method of controlling the microscope system according to claim 1, wherein
the first images comprises fluorescent images, and
the information extracted from the first images comprises information about a luminous point in the first images.

15. The method of controlling the microscope system according to claim 1, further comprising:
capturing the first images, along with changing an area of the sample to be imaged by the imaging unit.

16. The method of controlling the microscope system according to claim 15, further comprising:
displaying a large-viewing field fluorescent image on the display unit, wherein the large-viewing field fluorescent image is obtained by connecting fluorescent images that are captured at different imaging positions by changing the area of the sample to be imaged.

17. A microscope system comprising:
an imaging unit configured to image a sample; and
a display unit comprising a first display region and a second display region, wherein
the display unit sequentially displays, in the first display region, first images sequentially captured by the imaging unit,
the display unit displays, in the second display region, a second image generated based on information extracted from the sequentially captured first images,
the imaging unit sequentially captures third images to construct a super-resolution image, wherein
the second image comprises a preview image schematically reproducing the super-resolution image.

18. A non-transitory computer-readable storage medium storing a program executable by a computer for a microscope system to perform operations comprising: sequentially displaying, in a first display region of a display unit, first images of a sample sequentially captured by an imaging unit; displaying, in a second display region of the display unit, a second image generated based on information extracted from the sequentially captured first images; and sequentially capturing, by the imaging unit, third images to construct a super-resolution image, wherein the second image comprises a preview image schematically reproducing the super-resolution image.

* * * * *